United States Patent
Sakoda et al.

(10) Patent No.: US 6,590,860 B1
(45) Date of Patent: Jul. 8, 2003

(54) RECEIVING DEVICE AND SIGNAL RECEIVING METHOD

(75) Inventors: Kazuyuki Sakoda, Tokyo (JP); Mitsuhiro Suzuki, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/042,502

(22) Filed: Mar. 17, 1998

(30) Foreign Application Priority Data

Mar. 19, 1997 (JP) .............................................. 9-067062
Jun. 2, 1997 (JP) .............................................. 9-144289

(51) Int. Cl.[7] .......................... H04J 11/00; H03D 1/00; H04B 7/212
(52) U.S. Cl. ........................ 370/203; 370/347; 375/341
(58) Field of Search ................................ 370/342, 479, 370/203, 208, 209, 474; 375/200, 205, 316, 340, 341, 261, 262, 279, 280, 281, 283, 324, 329–332, 326, 344–345; 329/304

(56) References Cited

U.S. PATENT DOCUMENTS

| | | | |
|---|---|---|---|
| 4,811,346 A | * 3/1989 | Battail ........................ | 371/43 |
| 5,173,702 A | * 12/1992 | Young et al. .................. | 342/17 |
| 5,191,576 A | 3/1993 | Pommier et al. ............. | 370/18 |
| 5,202,903 A | * 4/1993 | Okanoue ..................... | 375/100 |
| 5,271,042 A | 12/1993 | Borth et al. ................. | 375/101 |
| 5,278,871 A | 1/1994 | Rasky et al. .................. | 375/99 |
| 5,406,570 A | * 4/1995 | Berrou et al. ................. | 371/43 |
| 5,533,067 A | * 7/1996 | Jamal et al. ................. | 375/341 |
| 5,546,429 A | 8/1996 | Chiasson et al. ............ | 375/341 |
| 5,566,191 A | 10/1996 | Ohnishi et al. ............... | 371/43 |
| 5,590,158 A | * 12/1996 | Yamaguchi et al. ......... | 375/331 |
| 5,619,167 A | * 4/1997 | Adachi ....................... | 329/304 |
| 5,680,394 A | * 10/1997 | Bingham et al. ............. | 370/294 |
| 5,867,532 A | * 2/1999 | Ito et al. ..................... | 375/265 |
| 5,970,047 A | * 10/1999 | Suzuki ....................... | 370/210 |
| 5,991,308 A | * 11/1999 | Fuhrmann et al. .......... | 370/474 |
| 6,044,106 A | * 3/2000 | Suzuki ....................... | 375/219 |

FOREIGN PATENT DOCUMENTS

| | | | | |
|---|---|---|---|---|
| EP | 0736986 | 10/1996 | ............. | H04L/5/06 |
| WO | 9400938 | 1/1994 | ............. | H04L/1/20 |

* cited by examiner

Primary Examiner—Alpus H. Hsu
Assistant Examiner—Toan Nguyen
(74) Attorney, Agent, or Firm—Jay H. Maioli

(57) ABSTRACT

A receiving device makes the data conducted a high precision maximum likelihood sequence estimation and after transmission it can be restored with further improved accuracy. Since the receiving device (31, 32) for outputting a received signal (S27) upon receiving the transmission signal, the weighting circuit (35) for calculating the weight coefficient showing the reliability of slot by which said received signal is transmitted based on the received signal transmitted from the receiving device and multiplying this weight coefficient by the received signal and outputting it, and the decoding circuit (16) for decoding the received signal (S29) to be transmitted from the weighting circuit and restoring the data transmitted are provided, the maximum likelihood sequence estimation can be conducted upon adding the reliability of slot in the decoding circuit, and thereby, even in the case where the qualities of communications vary by slot, the transmitted data can be restored with further improved accuracy by conducting a high precision maximum likelihood sequence estimation.

21 Claims, 22 Drawing Sheets

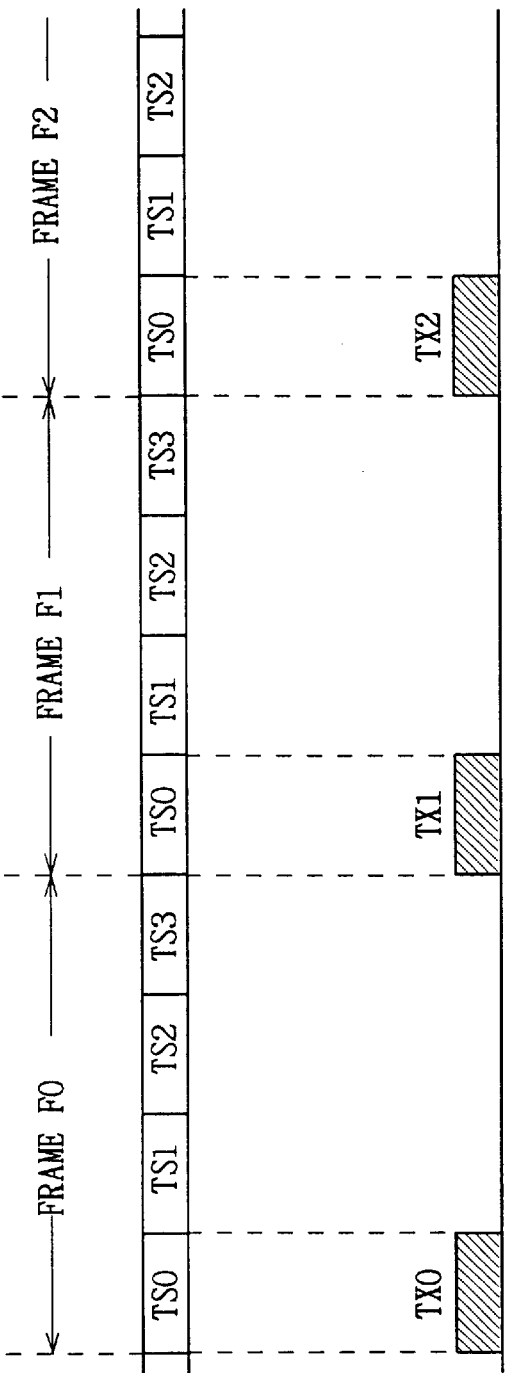

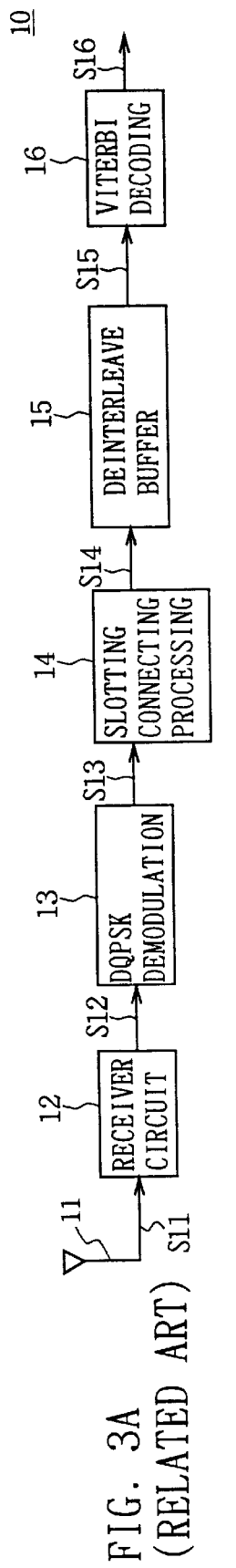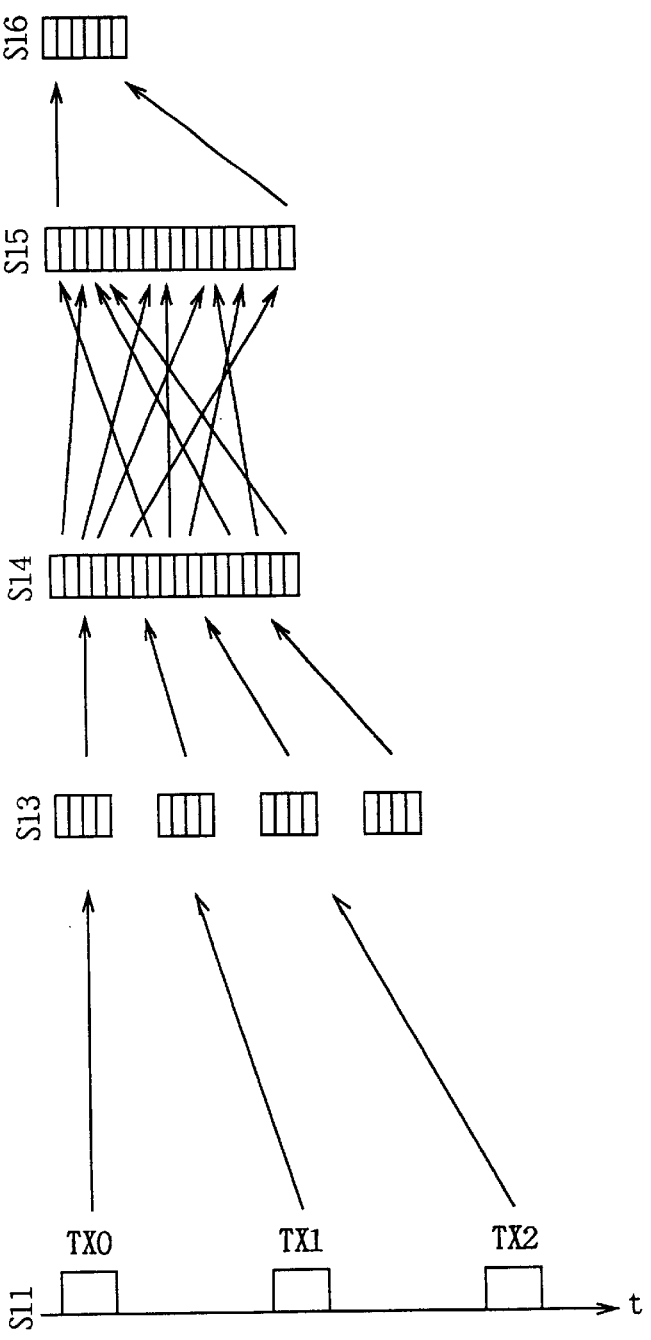
FIG. 3A (RELATED ART)
FIG. 3B (RELATED ART)

|  | M=1 | M=2 | M=3 | M=4 | M=5 | M=6 | M=7 | M=8 |
|---|---|---|---|---|---|---|---|---|
| L=1 | AA | BA | CA | DA | EA | FA | GA | HA |
| L=2 | AB | BB | CB | DB | EB | FB | GB | HB |
| L=3 | AC | BC | CC | DC | EC | FC | GC | HC |
| L=4 | AD | BD | CD | DD | ED | FD | GD | HD |
| L=5 | AE | BE | CE | DE | EE | FE | GE | HE |
| L=6 | AF | BF | CF | DF | EF | FF | GF | HF |
| L=7 | AG | BG | CG | DG | EG | FG | GG | HG |
| L=8 | AH | BH | CH | DH | EH | FH | GH | HH |

FIG. 22

RECEIVING DEVICE AND SIGNAL RECEIVING METHOD

BACKGROUND OF THE INVENTION

1. Field of the Invention

This invention relates to a receiving device and a signal receiving method, and more particularly, is applicable to a wireless communication system such as a portable telephone system.

2. Description of the Related Art

In this kind of wireless communication system, an area for offering the communication service is divided into cells with the desired size and a base station is provided in each cell as the fixed wireless station respectively, and portable telephone equipment as the mobile wireless station is arranged to wireless-communicate with the base station in the cell in which the portable telephone equipment itself exists. Although various types of communication systems have been proposed, one of typical devices is a time division multiple access system called the TDMA system.

This TDMA system is a system to divide the predetermined frequency channel into frames of the fixed time width F0, F1, . . . , as shown in FIGS. 1A and 1B and further divides the frame into time slots of the fixed time width TS0 to TS3 respectively, and users transmit the transmission signal when the time slot TS0 is allocated to his own station using a common frequency channel, and this system has made possible the realization of multiple communications (i.e., multiplex communications), users share a common frequency and frequency can be utilized efficiently. Thereinafter the time slot TS0 allocated to transmission is referred to as transmission slot TX, and the data block to be transmitted by one transmission slot TX is referred to as slot.

At this point, the transmitting device and receiving device of the wireless communication system for transmitting and receiving the digital signal using this TDMA system will be described referring to FIGS. 2A, 2B, 3A and 3B. In this connection, the transmitting device and the receiving device shown in FIGS. 2A, 2B, 3A and 3B are loaded on the portable telephone equipment and the base station of the portable telephone system, and are used for the communication from the portable telephone equipment to the base station or the base station to the portable telephone equipment.

As shown in FIG. 2A, the transmitting device 1 is roughly comprised of a convolutional coding circuit 2, an interleave buffer 3, a slotting processing circuit 4, a differential quadrature phase shift keying (DQPSK) modulation circuit 5, a transmission circuit 6 and an antenna 7, and first, inputs the transmission data S1 to be transmitted to the convolutional coding circuit 2.

The convolutional coding circuit 2 is comprised of a register and exclusive OR circuit of the fixed number of stages, and it applies convolutional coding to the input transmission data S1 and outputs the resultant transmission symbol S2 to the interleave buffer 3. The interleave buffer 3 sequentially stores the transmission symbol S2 in the memory area in order, and when the transmission symbol S2 is stored in said whole memory area (i.e., the desired volumes of transmission symbol S2 is stored), it permutes the transmission symbols S2 in random order (hereinafter this permutation is referred to as interleave) and outputs the resultant transmission symbol S3 to the slotting processing circuit 4. In this connection, the interleave buffer 3 has the memory capacity for multiple slots so that the transmission symbols can be spread out over a large number of transmission slots TX.

The slotting processing circuit 4 divides said transmission symbol S3 into slots in order to allocate the transmission symbol S3 to the transmission slots TX and sequentially outputs the transmission symbols S4 slotted to the DQPSK modulation circuit 5 per slot. The DQPSK modulation unit 5, by applying the DQPSK modulation processing to the transmission symbol S4 to be supplied per slot, forms a transmission signal S5 of which the symbol information is shown by the phase value and outputs this to the transmission circuit 6.

The transmission circuit 6, after applying the filtering processing to the transmission signal S5 to be supplied per slot, converts said transmission signal S5 to the analog signal, and forms the transmission signal with the fixed frequency channel by applying the frequency conversion onto the analog transmission signal, and after amplifying this to the fixed power, transmits this via an antenna 7. Thus, the transmission signal S6 divided into slots is transmitted from the transmitting device 1 synchronizing with the timing of transmission slots TX. In this connection, for reference purposes, a brief diagrammatic sketch of the signal processing to be conducted in each circuit of the transmitting device 1 described above is shown in FIG. 2B.

On the other hand, as shown in FIG. 3A, the receiving device 10 is roughly comprised of an antenna 11, a receiver circuit 12, a DQPSK demodulation circuit 13, a slot connecting processing circuit 14, a deinterleave buffer 15 and a Viterbi decoding circuit 16, and receives the transmission signal S6 transmitted from the transmitting device 1 by the antenna 11 and inputs this to the receiving circuit 12 as the received signal S11. The receiver circuit 12, after amplifying the input signal received S11, takes out a baseband signal by applying frequency conversion to said received signal S11 and after applying the filtering processing to this baseband signal S11, takes out received signal S12 which is DQPSK modulated by converting the baseband signal to the digital signal, and outputs this to the DQPSK demodulation circuit 13.

The DQPSK demodulation circuit 13 takes out symbol information by applying the DQPSK demodulation processing to the received signal S12 and outputs this to the slot connecting processing circuit 14 as a received symbol S13. In this connection, the value of this received symbol S13 is not binary signal such as "0" or "1" but it is a multi-level signal since noise element has been added on the transmission route. The slot connecting processing circuit 14 is a circuit to connect the received symbol S13 to be obtained fragmentally on a slot-by-slot basis to become continuous signal, and when the received symbol S13 is stored for the memory capacity of the deinterleave buffer 15 of the later stage, connects said received symbol S13 and outputs the connected received symbol S14 to the deinterleave buffer 15.

The deinterleave buffer 15 has a memory capacity for multiple slots, and after successively storing the received symbol S14 to be fed to the internal memory area, returns the received symbol S14 to the former order by permuting said received symbol S14 with the procedure contrary to the procedure conducted in the interleave buffer 3 of the transmitting device 1 and outputs the resulting received symbol S15 to the Viterbi decoding circuit 16 (hereinafter the procedure returning to the former order is referred to as deinterleave). The Viterbi decoding circuit 16 is comprised of a soft-decision Viterbi decoding circuit and by estimating the most likelihood condition the data can take from among all changing conditions (i.e., the maximum likelihood sequence estimation) considering the trellis of convolutional code based on the received symbol S15, the received data S16 showing the data transmitted is restored and output. In this connection, FIG. 3B is a brief diagram showing the signal processing to be conducted in each circuit of the receiving device 10 explained above.

However, in the receiving device 10, the received data S16 is restored conducting the maximum likelihood sequence estimation by the Viterbi-decoding circuit 16. However, in order to restore the received data S16 with higher accuracy it is desirous to further improve the efficiency of the maximum likelihood sequence estimation.

This point will be described more specifically in the following paragraphs. The received symbol S13 to be supplied from the DQPSK demodulation circuit 13 is multilevel signal as described above. The value of this multi-level signal roughly shows the reliability of the received symbol. The Viterbi decoding circuit to decode such multi-level signal is generally called as a soft-decision Viterbi decoding circuit and in general, it restores data by conducting the maximum likelihood sequence estimation upon adding the reliability of each symbol. On the other hand, the Viterbi decoding circuit to decode the binary value signal having the value "−1" or "+1" is generally known as a hard-decision Viterbi decoding circuit. When comparing this hard-decision Viterbi decoding circuit with the soft-decision Viterbi decoding circuit, it is generally said that the soft-decision Viterbi decoding circuit can conduct the maximum likelihood sequence estimation with higher accuracy than the hard-decision Viterbi decoding circuit. The reason is that in the case of soft decision Viterbi decoding circuit, since multi-level signal reflecting the reliability has been input, the estimation reflecting the reliability can be conducted. Accordingly, in order to increase accuracy in the maximum likelihood sequence estimation, it is considered that it would be better if the reliability of symbol were reflected by the signal to be input into the Viterbi decoding circuit.

However, in the case of TDMA system, the received symbol is transmitted after being divided into slots respectively, and it has a possibility that quality of communication varies on a slot-by-slot basis. Accordingly, in that case, it is considered that the maximum likelihood sequence estimation of the Viterbi decoding circuit can be done with higher precision if the reliability showing the communication quality of slot is reflected by the value of said symbol transmitted by that slot. Especially, when interleaves are conducted over multi-slots, it is possible that an erroneous estimation would be conducted if not reflecting the reliability because the reliabilities vary extremely by slot.

SUMMARY OF THE INVENTION

In view of the foregoing, an object of this invention is to provide a receiving device and a signal receiving method capable of decoding the data transmitted more accurately by conducting the high precision maximum likelihood sequence estimation.

The foregoing object and other objects of the invention have been achieved by the provision of a receiving method for receiving a signal composed of a set of predetermined information units. The receiving method comprises the steps of receiving the signal; calculating a weight coefficient showing the reliability of the received signal for each predetermined information unit; weighting the received signal by the weight coefficient; and decoding the weighted signal.

Further, according to this invention, a receiving device for receiving a signal composed of a set of predetermined information units, comprises: receiving means for receiving the signal; weight coefficient calculating means for calculating a weight coefficient showing the reliability of the signal output from the receiving means for each predetermined information unit; weighting means for weighting the signal output from the receiving means by the weight coefficient; and decoding means for decoding the signal output from the weighting means.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 1A and 1B are schematic diagrams explaining the principle of TDMA system;

FIGS. 3A and 3B are block diagrams showing a receiving device of the conventional wireless communication system;

FIG. 22 is a diagram showing a table for obtaining the signal-to-interference noise power ratio S/(I+N);

DETAILED DESCRIPTION OF THE EMBODIMENT

Preferred embodiments of this invention will be described with reference to the accompanying drawings:

(1) The First Embodiment

Figures 2A, 2B:
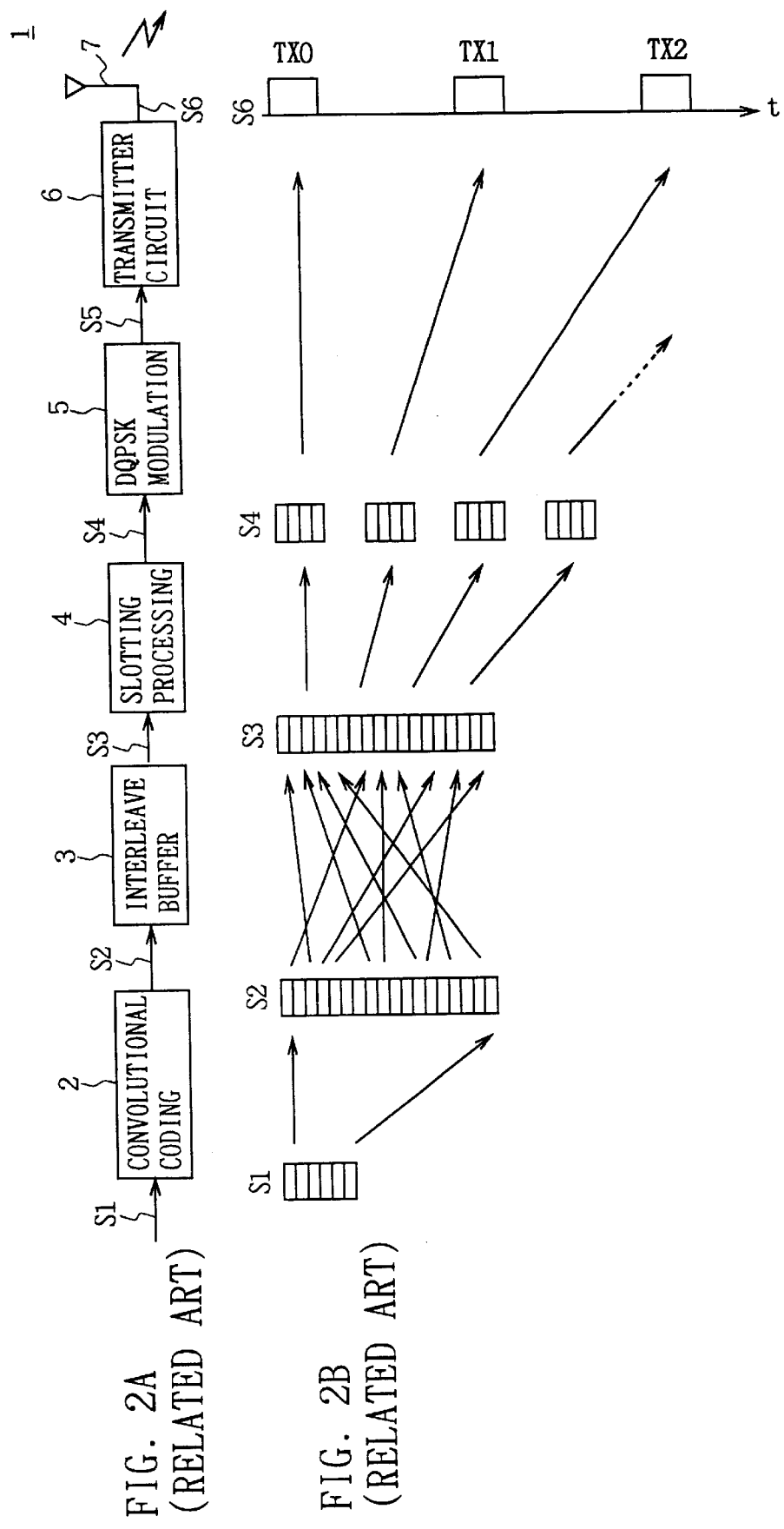
FIGS. 2A and 2B are block diagrams showing a transmitting device of the conventional wireless communication system.
Figure 4:
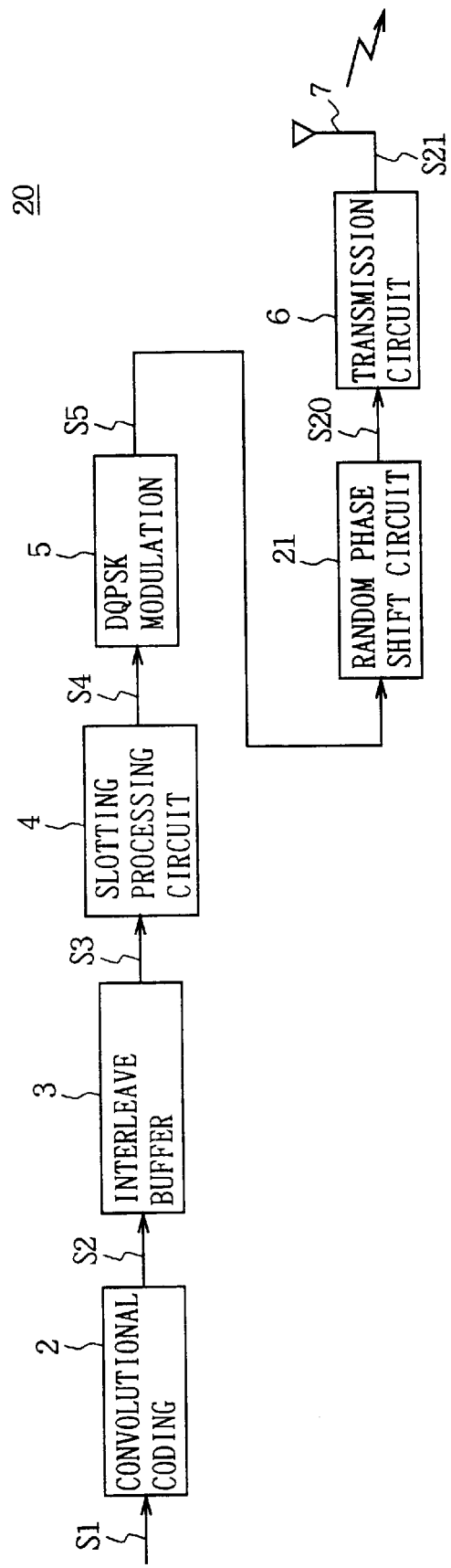
FIG. 4 is a block diagram showing a transmitting device of the wireless communication system according to one embodiment of the present invention.

First of all, general construction of a wireless communication system to which the present invention is applied will be described referring to FIGS. 4 and 5. In FIG. 4, in which corresponding parts of FIGS. 2A and 2B are designated the same reference numerals, 20 generally shows a transmitting device of the wireless communication system such as a portable telephone system, and it has almost the same construction as the transmitting device 1 shown in FIGS. 2A and 2B except that a random phase shift circuit 21 is added. In this transmitting device 20, the transmission symbol S4 output from the slotting processing circuit 4 is supplied into the DQPSK modulation circuit 5. The DQPSK modulation circuit 5 is a circuit to form transmission signal of which symbol information is shown with the phase value by applying the DQPSK modulation processing to the transmission symbol S4. In the case of this embodiment, π/4 shift DQPSK modulation processing (i.e., the maximum phase change is controlled to ±3 π/4 by shifting the phase change from the previous symbol for π/4) is conducted. The transmission signal S5 formed by this processing is supplied into the random phase shift circuit 21.

Figure 6:
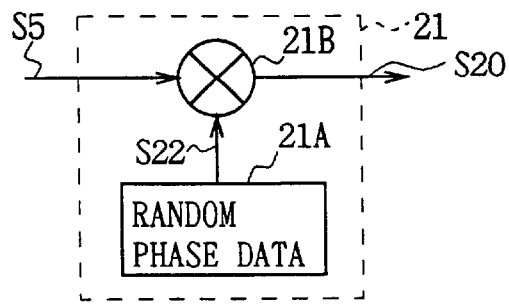
FIG. 6 is a block diagram showing a random phase shift circuit of the transmitting device.

The random phase shift circuit 21 applies random phase shift to the transmission signal S5 by successively multiplying the input transmission signal S5 by the phase data generated randomly per symbol. In this case, the random phase shift circuit 21 is comprised of a random phase data generation circuit 21A and multiplier 21B as shown in FIG. 6. The random phase data generation circuit 21A has an initial phase value which varies by communication channel (e.g., in the portable telephone system, by the base station) in advance, and generates random phase values sequentially from said initial phase value on the basis of a predetermined rule and outputs the phase data S22 showing the phase value to the multiplier 21B. In this connection, this phase data S22 is a complex number having random phase value with amplitude "1". The multiplier 21B conducts the random phase shift to the transmission signal S5 by successively multiplying the complex number of input transmission signal S5 by the complex number of the phase data S22 per symbol. Thus, the transmission signal S20 conducted with the random phase shift is sent out to the transmission circuit 6.

The receiving side of the communication is arranged to have the same initial phase value as the initial phase value described above, and generates the phase data identical to those of the transmitting side according to the same procedure. If the received signal is divided by this phase data to execute a restoring processing, the signal before the random phase shift is added can be restored. In this connection, if the party who is not the other party of communication receives the transmission signal with the added random phase shift, he cannot restore the former signal because he does not have the same initial phase value. Accordingly, if the communication would be conducted in utilizing different initial phase value by each communication channel, even in the case where each communication becomes interference wave with each other, signals of other than the communicating party, i.e., interference waves, phases of these interference waves remain in random conditions and interference waves can be seemingly converted to semi-noise.

Also according to this embodiment, the transmission circuit 6, after conducting the filtering processing on transmission signal S20, converts said transmission signal S20 to an analog signal and by converting the frequency to analog transmission signal, forms a transmission signal S21 having the fixed frequency channel and after amplifying this to the predetermined power, transmits this via an antenna 7.

Figure 5:
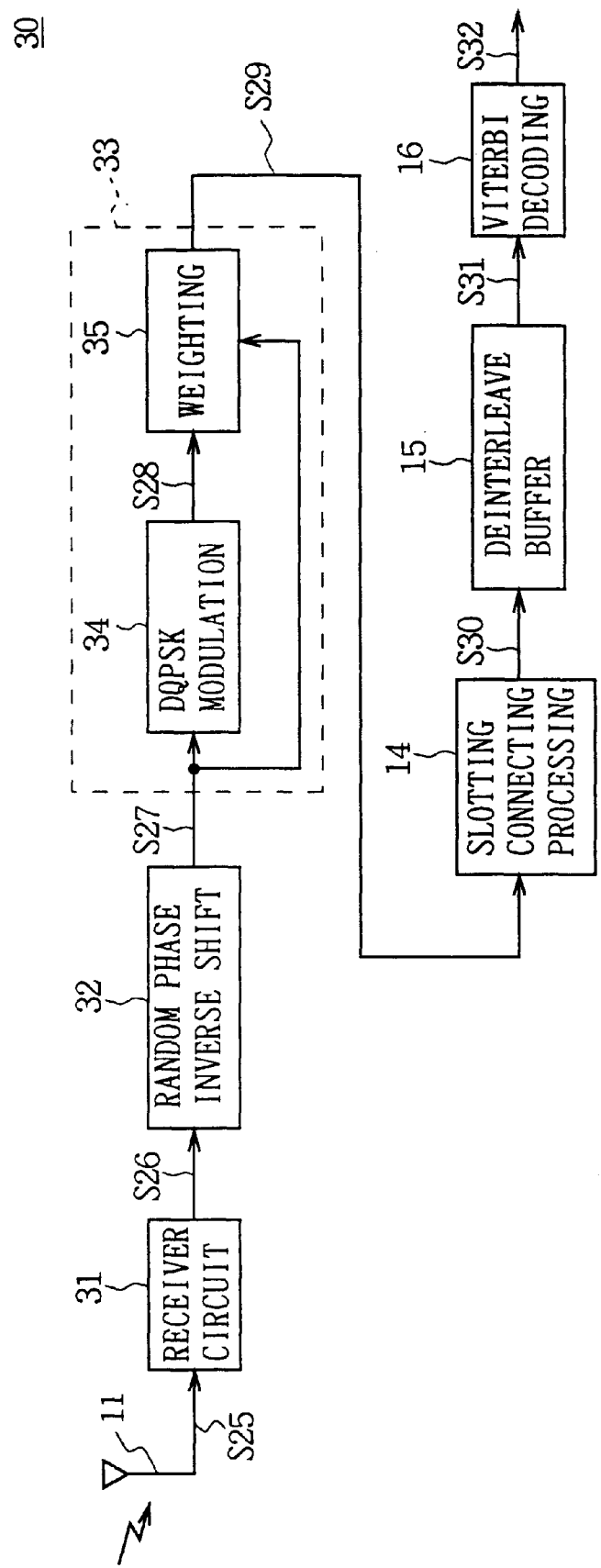
FIG. 5 is a block diagram showing a receiving device of the wireless communication system.

Then, in FIG. 5 in which corresponding parts of FIGS. 3A and 3B are given the same reference numerals, 30 generally shows a receiving device of the wireless communication system according to the present invention, and it has almost equal construction to that of the receiving device 10 shown in FIGS. 3A and 3B except having a receiver circuit 31, a random phase inverse shift circuit 32 and demodulation circuit 33. First, the antenna 11 receives the transmission signal S21 transmitted from the transmitting device 20 and inputs this as a received signal S25 to the receiver circuit 31. The receiver circuit 31, after amplifying the received signal S25 to be fed to the predetermined power, takes out baseband signal by applying the frequency conversion to said received signal S25, and after applying the filtering processing to this baseband signal, takes out the received signal S26 with the added random phase shift by digitalizing said baseband signal, and outputs this to the random phase inverse shift circuit 32. In this connection, in the case of outputting the received signal S26, the analog-to-digital conversion circuit of this receiver circuit 31, after amplifying the received signal so that the power of each slot becomes constant, outputs this. According to this wireless communication system, since signals are transmitted on a slot-by-slot basis, there is a possibility that fadings received on the transmission route vary by slot and accordingly it is possible that the signal powers vary by slot.

Figure 7:
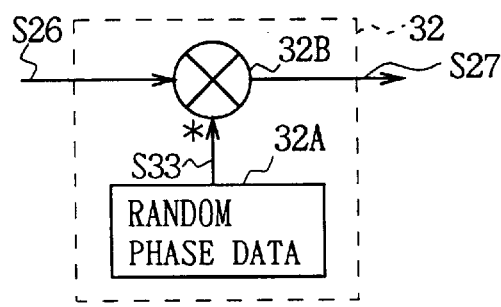
FIG. 7 is a block diagram showing a random phase inverse shift circuit of the receiving device.

The random phase inverse shift circuit 32, by successively applying the division processing to the phase data showing the same phase value as the transmitting side with respect to the received signal S26 to be entered, returns the random phase shift given to said received signal S26 to the former phase. In practice, as shown in FIG. 7, the random phase inverse shift circuit 32 is comprised of a random phase data generation circuit 32A and multiplier 32B. The random phase data generation circuit 32A has the same initial phase value as the transmitting side, and generates the same phase value as the transmitting side from said initial phase value based on the fixed rule as in the transmitting side, and outputs the phase data S33 showing the phase value having the conjugate relation with that phase value to the multiplier 32B (asterisk "*" shows conjugate relation in the figure) In this connection, this phase data S33 is a complex number of amplitude "1" having the phase value which has the conjugate relation with the phase value generated in the transmitting side. The multiplier 32B, by multiplying the complex number of the received signal S26 to be entered by the complex number of the phase data S33 successively per symbol, cancels the phase change added to said received signal S26 and returns to the former phase condition. Thus, if the phase data S33 having the conjugate relation to the phase data of the transmitting side is used, the phase inverse shift can be performed using the multiplier 32B instead of the divider.

The received signal S27 restored to the former phase by the random phase inverse shift circuit 32 is supplied to the following demodulation circuit 33. The demodulation circuit 33 is comprised of a DQPSK demodulation circuit 34 and a weighting circuit 35, and inputs the received signal S27 into the DQPSK demodulation circuit 34 and the weighting circuit 35 respectively. The DQPSK demodulation circuit 34 takes out symbol information by applying the DQPSK demodulation processing to the received signal S27 and outputs this to the weighting circuit 35 as received symbol S28. The weighting circuit 35 calculates the reliability of slot by which said received signal S27 has been transmitted per slot based on the received signal S27, and calculates the weight coefficient corresponding to that reliability. Then, the weighting circuit 35, multiplying the received symbol S28 by that weight coefficient, reflects the reliability of the slot to the signal level of said received symbol S28 and outputs the resulting received symbol S29 to the slot connecting processing circuit 14.

The slothing connecting processing circuit 14 is a circuit to connect the received symbol S29 in order that the received symbol S29 to be obtained fragmentarily becomes continuous signal, and when the received symbol S29 is stored for the memory capacity of the deinterleave buffer 15 of the later stage, connects said received symbol S29 and outputs this connected received symbol S30 to the deinterleave buffer 15. The deinterleave buffer 15 has the memory capacity for multiple slots, and after successively storing the received symbol S30 to be fed to the internal memory area, permutes the order of said received symbol S30 with the procedure contrary to the permutation conducted at the interleave buffer 3 of the transmitting device 20 and returns to the former order, and outputs the resulting received symbol S31 to the Viterbi decoding circuit 16.

The Viterbi decoding circuit 16 is comprised of a soft-decision Viterbi decoding circuit and by conducting the maximum likelihood sequence estimation to the input received symbol S31, restores the received data S32 showing data transmitted. In this case, in the weighting circuit 35 of the preceding stage, the reliability of the slot by which the received symbol S28 is calculated and the received symbol S28 is transmitted is multiplied by the weight coefficient to show the reliability of that slot. Accordingly, the signal level of the received symbol S31 to be fed to the Viterbi decoding circuit 16 becomes the level corresponding to the reliability of the slot, and even in the case where the qualities of communications vary by slot, that communication quality is reflected to the signal level by the reliability. Thus, if such received symbol S31 would be entered into the Viterbi decoding circuit 16, the Viterbi decoding circuit 16 conducts the maximum likelihood sequence estimation upon adding the reliability per slot, and thereby the maximum likelihood sequence estimation can be conducted with higher precision and the received data can be restored with further improved accuracy.

Figure 8:
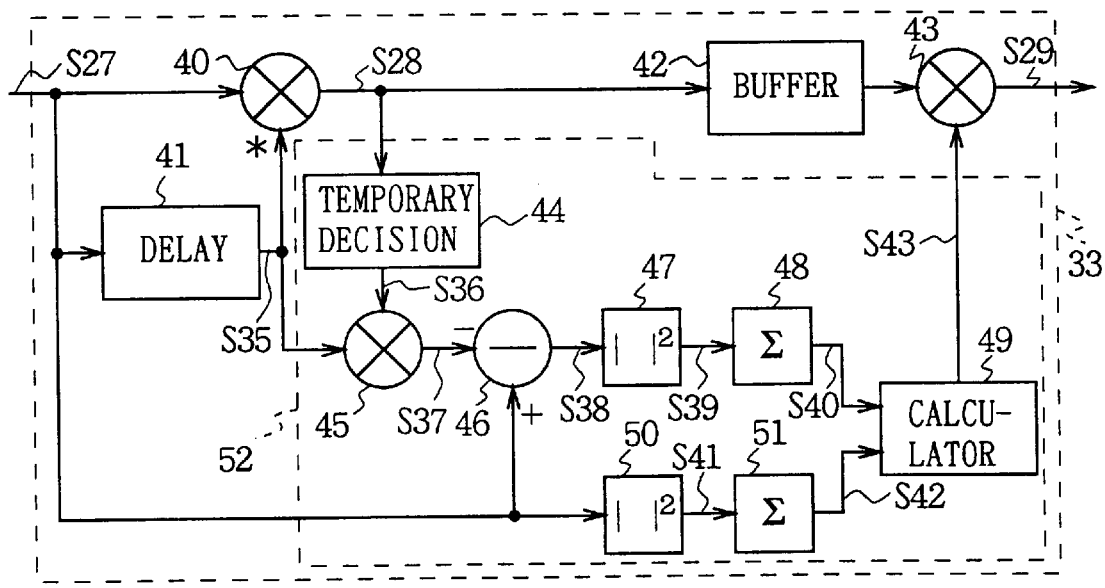
FIG. 8 is a block diagram showing a demodulation circuit of the receiving device.

At this point, the construction of the demodulation circuit 33 will be described more concretely referring to FIG. 8. As shown in FIG. 8, in the demodulation circuit 33, received signal S27 formed of complex signal which is supplied from the random phase inverse shift circuit 32 is supplied into the DQPSK decoding circuit comprising a multiplier 40 and a delay circuit 41. The multiplier 40 receives the received signal S35 delayed for one symbol to be sent out from the delay circuit 41, and by complex-multiplying the input received signal S27 by the conjugate value of one symbol preceding received signal S35, extracts the received symbol S28 from said received signal S27. Provided that the received symbol S28 to be taken out by this multiplication processing is the symbol information QPSK modulated. This received symbol S28 is fed to the following first-in first-out buffer (hereinafter referred to as FIFO buffer) 42 and is successively stored. The FIFO buffer 42 holds the received symbol S28 until it is accumulated for one slot and when it is accumulated for one slot, the FIFO buffer 42 outputs said received symbol S28 to the following multiplier 43.

Furthermore, the received symbol S28 taken out by the multiplier 40 is also supplied to a temporary decision circuit 44 comprising a weight coefficient calculation unit 52. This temporary decision circuit 44 temporarily decides the phase condition of the received symbol S28 on which phase condition it is now in four phase conditions of QPSK and outputs the complex signal S36 having the amplitude showing that temporarily decided phase condition is "1" to a multiplier 45. The received signal S35 delayed for one symbol to be sent out from the delay circuit 41 is supplied into the multiplier 45, and said multiplier 45, multiplying the complex signal S36 from the temporary decision circuit 44 by the received signal S35 delayed for one symbol, forms signal DQPSK modulated based on the temporary decision result, i.e., reproduced signal of the received signal S27. Hereinafter, this signal is referred to as a replica received signal S37 with respect to the original received signal S27.

The replica received signal S37 formed by the multiplier 45 is fed to a subtracter 46. In the subtracter 46, the original received signal S27 is also entered, and the subtracter 46 subtracts the replica received signal S37 from the original received signal S27 and outputs signal element S38 showing the subtraction result to the first square-law circuit 47. In this case, if the decision result of the temporary decision circuit 44 is correct, this signal element S38 becomes the signal in which both noise element contained in the received signal S27 at the time when tentative decision is made and the noise element contained in the one symbol preceding received signal are combined.

The first square-law circuit 47, by squaring the amplitude of the signal element S35 per symbol, obtains the power of noise element per symbol and outputs this noise power S39 to an adder 48. The first adder 48, adding the noise power S39 of each symbol to be output from the first square-law circuit 47, obtains the noise power S40 for one slot added up noise powers of all symbols consisting of one slot and outputs this to a calculator 49.

Furthermore, the received signal S27 supplied from the random phase inverse shift circuit 32 is also fed to the second square-law circuit 50. The second square-law circuit 50 obtains the power of received signal S27 per symbol by squaring the amplitude of the received signal S27 and outputs that signal power S41 to the second adder 51. The second adder 51 calculates one slot of signal power S42 added up the signal powers of all symbols consisting one slot by adding the signal power S41 of each symbol to be output from the second square-law circuit 50 and outputs this to the calculator 49. In this connection, this signal power S42 shows signal power of the received signal S27 and this is the signal power in which actual signal element power and the noise element power are combined.

The calculator 49, after calculating the weight coefficient S43 showing the reliability of slot based on the noise power S40 and the signal power S42 of the received signal S27 which are input, outputs this to the multiplier 43. The multiplier 43, multiplying the received symbol S28 to be output from the FIFO buffer 42 by the weight coefficient S43, reflects the reliability of slot to the amplitude of said received symbol S28. Thus, the received symbol S29 reflects the reliability of slot.

Figure 9:
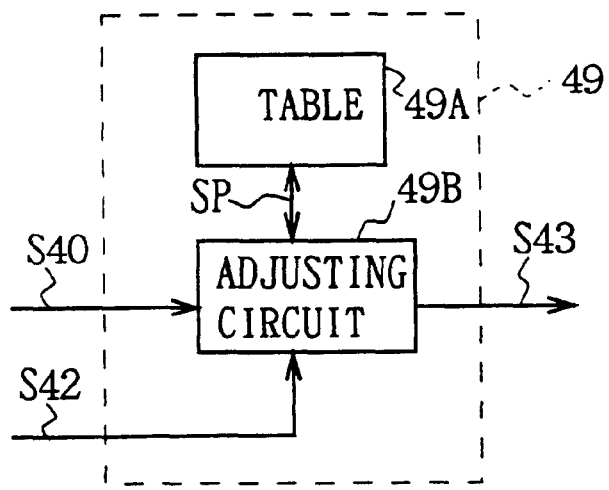
FIG. 9 is a block diagram showing a calculation unit of the demodulation circuit.

At this point, the construction of the calculation unit 49 will be shown in FIG. 9. The calculation unit 49 is comprised of a weight coefficient calculation table 49A and an adjusting circuit 49B. The weight coefficient calculation table 49A is made up of a memory in which the weight coefficient table is stored and by specifying the predetermined parameter, the weight coefficient corresponding to said parameter can be read out. This weight coefficient is a coefficient to show the reliability of slot, i.e., the communication quality, and a coefficient to show the signal to noise power ratio S/N. The adjusting circuit 49B calculates parameter SP to read the weight coefficient based on the input noise power S40 and the signal power S42, and by specifying said parameter SP on the weight coefficient calculation table 49A, reads the weight coefficient corresponding to the parameter SP and outputs this as a weight coefficient S43.

Figure 10:
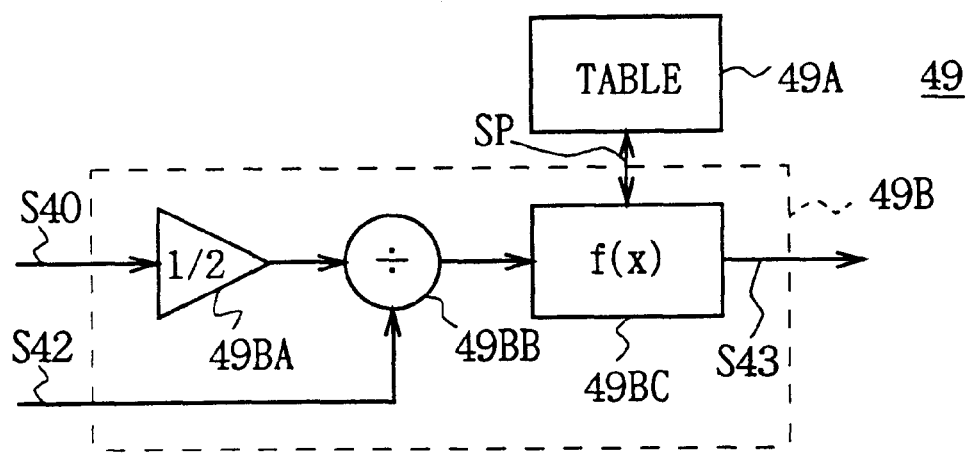
FIG. 10 is a block diagram showing an adjusting circuit of the calculation unit.

Here, the construction of adjusting circuit 49B will be explained in the following paragraphs. The adjusting circuit 49B, as shown in FIG. 10, for example, is comprised of a 1/2 circuit 49BA, a divider 49BB and a calculation circuit 49BC. First, as described above since the noise power S40 is the sum of two symbols of noise power S39, it is twice as large as the actual noise power. Accordingly, the noise power S40 is fed to the 1/2 circuit 49BA and by halving said noise power S40, the actual noise power is obtained. This noise power is fed to the divider 49BB and here the dividing processing is conducted. The divider 49BB divides the input noise power by signal power S42, obtains noise "N" to signal power "S" ratio. In this case, because the signal power S42 contains noise element, the noise to signal ratio obtainable here is N/(S+N). In this connection, if the number of symbols used at the time when calculating the noise power S40 and the number of symbols used when calculating the signal power S42 are different, the noise power S40 may be normalized by that number of symbols and after normalizing the signal power S42 by that number of symbols, the noise to signal power N/(S+N) ratio may be obtained.

In this case, a table showing the noise to signal power ratio N/(S+N) versus the signal to noise power ratio S/N ratio (this value is an estimated value based on the real value) is stored in the weight coefficient calculation table 49A, and the calculation circuit 49BC, assuming the noise to signal power ratio (N/(S+N) to be supplied from the divider 49BB as the parameter SP, reads out the corresponding signal to noise power ratio S/N from the weight coefficient calculation table 49A and outputs this as the weight coefficient S43. In this connection, if the temporary decision circuit 44 conducts erroneous temporary decision, the value of noise power S40 drops below the real noise power, and thus, the table which the noise to signal power ratio S/(S+N) and the signal to noise power ratio S/N are corrected for that portion may be stored in the weight coefficient calculation table 49A.

According to the foregoing construction, in the case of this receiving device 30, the demodulation circuit 33 performs the temporary decision on the received symbol S28 and forms a replica of the received signal S37 which is a replicated received signal S27 based on the temporary decision result S36 and the one symbol preceding received signal S27. And by taking the difference between this replica received signal S37 and the original received signal S27, the noise element S38 per symbol is obtained and the noise power S40 for one slot is obtained based on this. Also, at the same time, one slot of signal power S42 of the original received signal S27 is obtained. Based on this noise power S40 and the signal power S42 obtained, the weight coefficient S43 showing the signal to noise power ratio S/N of that slot is obtained and this is multiplied by the received symbol S28. By conducting this per slot, the signal to noise power ratio S/N of the slot is reflected to the amplitude of the received symbol S28 and thus, the received symbol S29 reflected the reliability of slot is formed. If such received symbol S29 reflected the reliability of slot would be entered into the Viterbi decoding circuit 16 via the slot connecting processing circuit 14 and the deinterleave buffer 15 of the later stage, said Viterbi decoding circuit 16 can conduct the maximum likelihood sequence estimation upon adding the reliability of each slot, and the received data can be decoded with higher accuracy.

Figure 11:
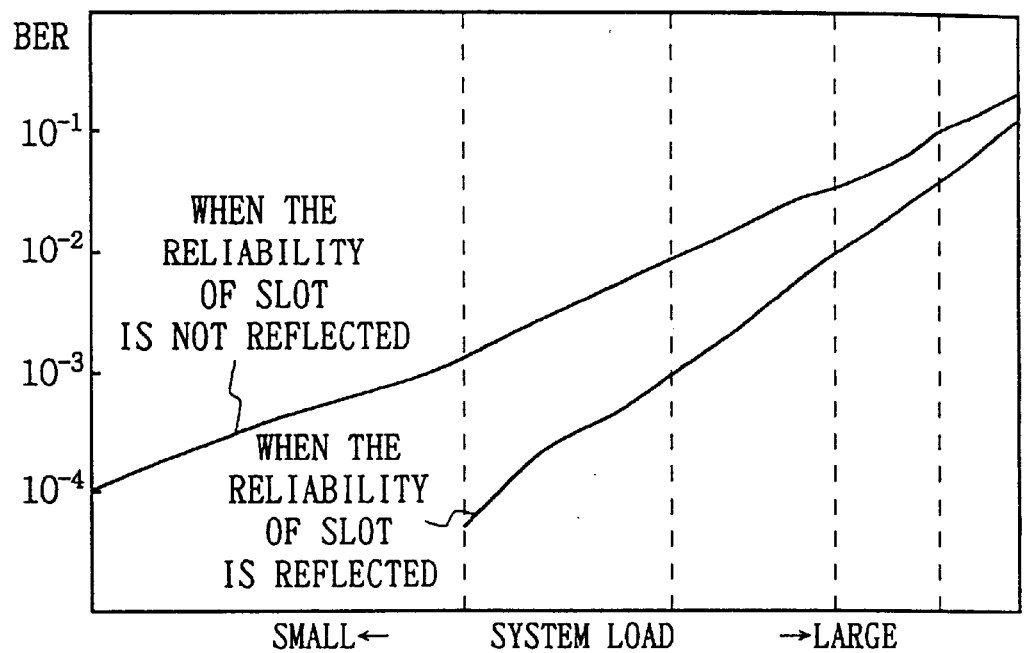
FIG. 11 is a characteristic curvilinear diagram of bit error rate explaining the comparison between the case where the reliability of slot is reflected and the case where the reliability of slot is not reflected.

In this connection, the bit error rate of the received signal in the case where the reliability of slot is reflected by multiplying the received symbol S28 by the weight coefficient and the case where the reliability is not reflected is shown in FIG. 11. The system load shown in the figure indicates the utilization factor of channel in the wireless communication system and this is proportional to the interference wave power. As is clear from FIG. 11, the received data can be restored more accurately when the reliability of slot is reflected to the received symbol S28.

Figure 12:
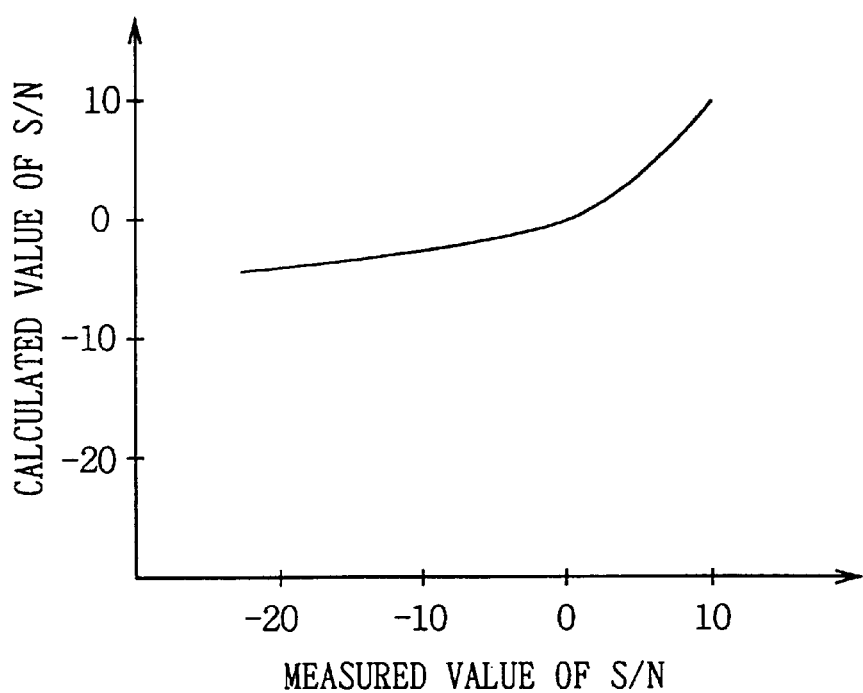
FIG. 12 is a characteristic curvilinear diagram explaining the comparison between the signal-to-noise power ratio S/N calculated and the signal-to-noise power ratio S/N measured.

Furthermore, in the case of receiving device 30, since the signal to noise power ratio S/N of slot is stored in the weight coefficient calculation table 49A as a weight coefficient, and based on the noise power S40 and signal power S42, the signal to noise power ratio S/N is read out from that table 49A, and making this the weight coefficient S43, the weight coefficient S43 which shows the reliability of slot correctly can be calculated easily with the simple construction. In this connection, the signal to noise power ratio S/N is obtained based on the noise power S40 and signal power S42, and this may be used as the weight coefficient S43. However, as shown in FIG. 12, there is a tendency that the signal to noise power ratio S/N obtained by calculation does not match the real value when the signal to noise power ratio S/N is in the poor condition and errors are introduced. However, by supplementing this portion, if the estimated value close to the real signal to noise power ratio S/N would be prepared and tabulated, then the correct signal to noise power ratio S/N can be obtained and the weight coefficient S43 to show the reliability correctly can be obtained.

According to the foregoing construction, as well as obtaining the signal power S42, the noise power S40 is obtained from the received signal S2. The weight coefficient S43 showing the signal to noise power ratio S/N is calculated based on the noise power S40 and the signal power S42 and multiplying this by the received symbol S28, the reliability of slot can be reflected to said received symbol S28. Thus, if the received symbol S29 reflecting the reliability of slot were fed into the Viterbi decoding circuit 16, the maximum likelihood sequence estimation can be conducted after adding the reliability of each slot, and thereby the received data S32 can be restored with higher accuracy.

(2) The Second Embodiment

Figure 13:
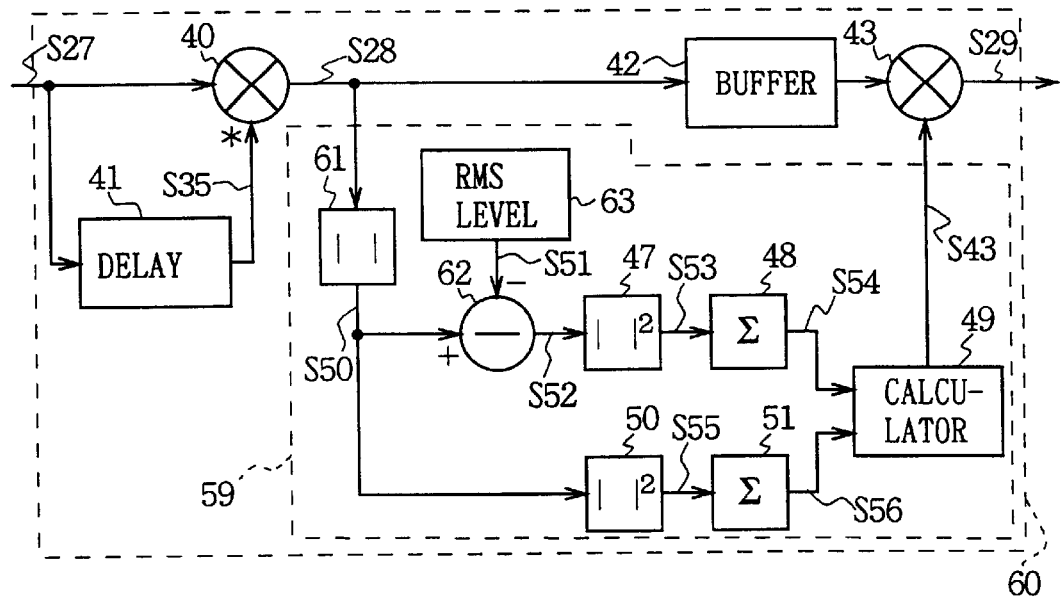
FIG. 13 is a block diagram showing a demodulation circuit according to the second embodiment.

In FIG. 13, in which corresponding parts of FIG. 8 are given the same reference numerals, 60 generally shows a demodulation circuit according to the second embodiment. The received signal S27 is input to a multiplier 40 and delay circuit 41 which constitute the DQPSK demodulation circuit. The multiplier 40 receives received signal S35 delayed for one symbol to be supplied from the delay circuit 41 and extracts the received symbol S28 from the received signal S27 by complex-multiplying the input received signal S27 by the conjugate value of the one symbol preceding received signal S35. Provided that the received symbol S28 to be extracted by this multiplication processing is the symbol information which is QPSK modulated. This received symbol S28 is input to the succeeding FIFO buffer 42 and is successively stored in this FIFO buffer 42. The FIFO buffer 42 holds the received symbol S28 until it is stored for one slot and when it is stored for one slot, the FIFO buffer 42 outputs said received symbol S28 to the succeeding multiplier 43.

Furthermore, the received symbol S28 taken out by the multiplier 40 is also input to an absolute value circuit 61 comprising a weight coefficient calculating unit 59. This absolute value circuit 61 converts the symbol information to the upper right quadrant on the complex plane by taking the absolute value of I element and Q element of the received symbol S28 formed of QPSK signal and outputs the converted received symbol S50 to a subtracter 62 and the second square-law circuit 50.

The reference symbol signal S51 to be sent out from the RMS level circuit 63 is entered into the subtracter 62. This reference symbol signal S51 is a signal whose phase is positioned at $\pi/4$ on the complex plane and its amplitude becomes the average power per symbol in that slot. The subtracter 62, subtracting this reference symbol signal S51 from the received symbol S50, calculates the difference and outputs signal element S52 showing the difference to the square-law circuit 47. In this connection, this signal element S52 shows the noise element contained in the received symbol S50.

The first square-law circuit 47, by squaring the amplitude of signal element S52 per symbol, obtains the noise element power per symbol and outputs the noise power S53 to the first adder 48. The first adder 48, adding the noise power S53 of each symbol to be sent out from the first square-law circuit 47, obtains the noise power S54 for one slot and outputs this to the calculator 49.

On the other hand, the second square-law circuit 50 obtains signal power S55 per symbol by squaring the amplitude of the received symbol S50 supplied from the absolute value circuit 61 and outputs this to the second adder 51. The second adder 51, adding the signal power S55 of each symbol to be sent out from the second square-law circuit 50, obtains the signal power for one slot and outputs this to the calculator 49. In this connection, this signal power S56 becomes the signal power in which real signal element power and noise element power are combined just as in the case of the first embodiment.

The calculator 49 calculates the weight coefficient S43 showing the signal to noise power ratio S/N based on the input noise power S54 and signal power S56 and outputs this to the multiplier 43. The multiplier 43, multiplying the received symbol S28 to be sent out from the FIFO buffer 42 by this weight coefficient, reflects the signal to noise power ratio S/N of slot to the amplitude of said received symbol S28. In the case of this embodiment, by reflecting the signal to noise power ratio S/N of slot to the received symbol S28, the received symbol S29 which is reflected the reliability of slot can be formed. In this connection, the calculator 49 is comprised of a weight coefficient calculation table 49A and adjusting circuit 49B as shown in FIG. 9 in this embodiment, and calculates parameter SP tabulated based on the input noise power S64 and signal power S56, and specifying said parameter SP to the weight coefficient calculation table 49A, reads the desired weight coefficient and outputs this as the weight coefficient S43.

According to the foregoing construction, in the demodulation circuit 60 according to the second embodiment, received symbol S28 is transformed into the upper right quadrant on the complex plane by the absolute value circuit 61, and calculating the difference between that transformed received symbol S50 and the reference symbol signal S51, the noise signal element S52 is calculated and based on this, the noise power S54 for one slot is calculated. Furthermore, in tandem with this, the signal power S56 for one slot is obtained based on the received symbol S50. Then, based on this noise power S54 and signal power S56, the weight coefficient S43 showing the signal to noise power ratio S/N of that slot is obtained and multiplied by the received symbol S28. By conducting this processing per slot, the signal to noise power ratio S/N of the slot is reflected to the amplitude of the received symbol S28 and thus, the received symbol S29 reflected the reliability of slot is formed. If such received symbol S29 reflecting the reliability of slot would be entered into the Viterbi decoding circuit 16 of the succeeding step, the maximum likelihood sequence estimation can be conducted upon adding the reliability of each slot in the Viterbi decoding circuit 16, and the received data S32 can be restored with higher accuracy.

According to the foregoing construction, since after transforming the received symbol S28 into the upper right quadrant on the complex plane, the noise power S54 is obtained upon subtracting the reference symbol signal S51 from the received symbol S50 converted, and signal power S56 is obtained from said received symbol S50, and based on that noise power S54 and the signal power S56, the weight coefficient S43 showing the signal to noise power ratio S/N of the slot is calculated and multiplied by the received symbol S28, the reliability of slot can be reflected to the received symbol S28. Thus, if the received symbol S29 which is reflected the reliability of slot would be fed to the Viterbi decoding circuit 16, the maximum likelihood sequence estimation can be conducted upon adding the reliability of each slot, and thereby the received data S32 can be restored more accurately.

(3) The Third Embodiment

Figure 14:
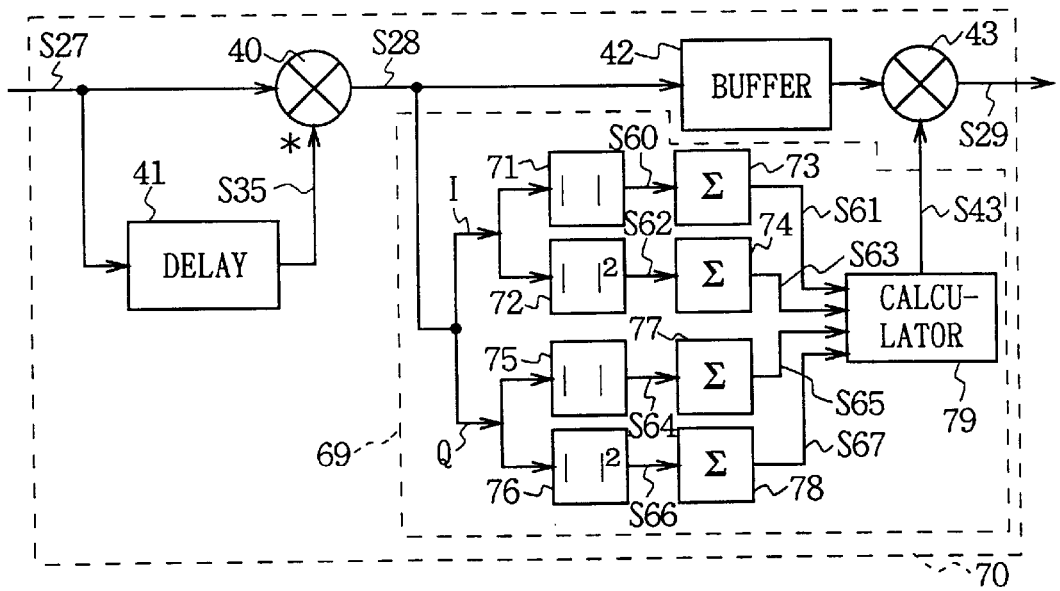
FIG. 14 is a block diagram showing a demodulation circuit according to the third embodiment.

In FIG. 14, in which corresponding parts of FIG. 8 are given the same reference numerals, 70 generally shows a demodulation circuit according to the third embodiment, and the received signal S27 is supplied into the multiplier 40 and delay circuit 41 comprising the DQPSK demodulation circuit as in the case of the first embodiment. The multiplier 40 receives the received signal S27 delayed for one symbol to be transmitted from the delay circuit 41 and by complex-multiplying the conjugate value of the one symbol preceding received signal S35 by the input received signal S27, extracts received symbol S28 from said received signal S27. Provided that the received symbol S28 extracted by this multiplication processing is the QPSK modulated symbol information. This received symbol S28 is input to the succeeding FIFO buffer 42 and successively stored. The FIFO buffer 42 holds the received symbol S28 till it is stored for one slot and when one slot of symbol is stored, the FIFO buffer 42 outputs said received symbol S28 to the following multiplier 43.

Furthermore, the received symbol S28 taken out by this multiplier 40 is also supplied into the weight coefficient calculation unit 69. In the weight coefficient calculation unit 69, I element in the received symbol S28 is fed to the first absolute value circuit 71 and the first square-law circuit 72, while Q element of the received symbol S28 is fed to the second absolute value circuit 75 and the second square-law circuit 76. The first absolute value circuit 71, by obtaining the absolute value of I element, obtains the amplitude of said I element per symbol and outputs the signal element S60 showing this I element amplitude to an adder circuit 73. The first adder circuit 73 sums up amplitudes of I element for one slot by adding one slot of signal element S60 showing the amplitude of I element and outputs signal element S61 showing the sum of amplitudes of that I element to the calculation unit 79.

On the other hand, the first square-law circuit 72 calculates the power of I element per symbol by squaring the I element per symbol and outputs the signal element S62 showing the I element power per symbol to the second adder circuit 74. The second adder circuit 74, by adding one slot of the signal element S62 showing I element powers per symbol, sums up powers of I element for one slot and outputs signal element S63 showing the sum of that I element powers to the calculation unit 79.

Similarly, the second absolute value circuit 75 in which Q element is entered obtains amplitudes of the Q element per symbol by obtaining the absolute value of the Q element and outputs signal element S64 showing the amplitude of this Q element to the third adder circuit 77. The third adder circuit 77, by adding one slot of signal element S64 showing the amplitude of this Q element, sums up amplitudes of the Q element for one slot and outputs signal element S65 showing the sum of amplitudes of that Q element to the calculation unit 79.

The second square-law circuit 76, by squaring the Q element per symbol, calculates powers of the Q element per symbol and outputs signal element S66 showing the Q element power per symbol to the fourth adder circuit 78. The fourth adder circuit 78, by adding one slot of that signal element S66 showing the power of the Q element per symbol, adds up powers of the Q element for one slot and outputs signal element S67 showing the power of that Q element to the calculation unit 79.

Here, the sum of amplitudes and powers of the I and Q elements is obtained by the first to fourth adder circuits in order to simplify the construction. However, dividing this by the number of symbols, the average value of amplitude and power may be obtained.

The calculation unit 79 calculates the weight coefficient S43 showing the signal to noise power ratio S/N of the slot based on the sum of amplitudes of I element to be entered (S61) and the sum of powers of I element (S63), and the sum of amplitudes of Q element (S65) and the sum of powers of Q element (S67), and outputs these to the multiplier 43. The multiplier 43, by multiplying the received symbol S28 from the FIFO buffer 42 by this weight coefficient S43, makes the signal to noise power ratio S/N of the slot reflect on the amplitude of said received symbol S28. Accordingly, in the case of this embodiment, the received symbol S29 reflects the reliability of the slot.

Figure 15:
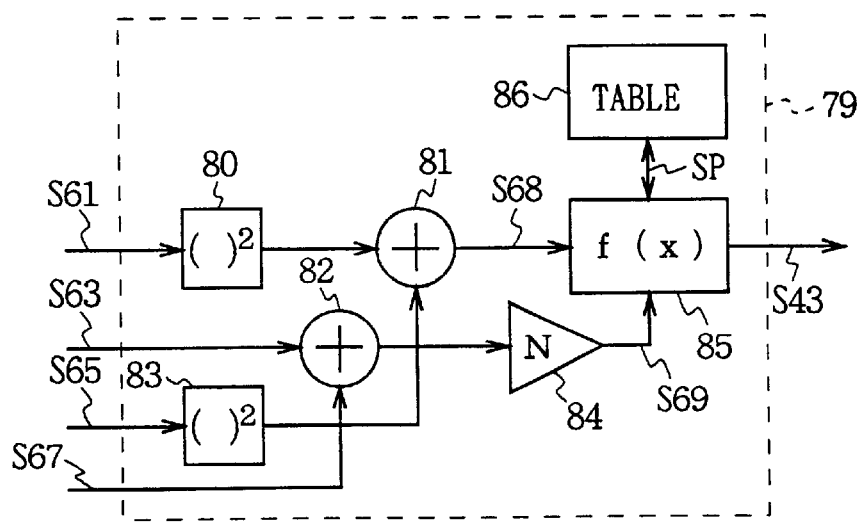
FIG. 15 is a block diagram showing a calculation unit of the demodulation circuit according to the third embodiment.

At this point, the construction of the calculation unit 79 is shown in FIG. 15. In the calculation unit 79, as shown in the FIG. 15, the square of the amplitude of I element is obtained by inputting the signal element S61 showing the amplitude of I element into the third square-law circuit 80, the square of the amplitude of Q element is obtained by inputting the signal element S65 showing the amplitude of Q element to the fourth square-law circuit 83. These squared values of amplitudes of I and Q elements obtained are input respectively to the adder circuit 81 and added up and the resulting signal element S68 showing the squared value of amplitude is fed into the calculation circuit 85.

On the other hand, after the signal element S63 showing the power of I element and the signal element S67 showing the power of Q element are fed into the adder circuit 82 and added up, they are fed into a N-fold circuit 84 and are increased the number of symbol times. The calculation circuit 85 obtains the randomized values of I and Q elements by subtracting the squared value of amplitude (S68) from the power increased the number of symbol times (S69) and specifies this on the weight coefficient calculation table 86 as a tabulation parameter SP. In the weight calculation table 86, a table on which the randomized values of I and Q element and corresponding weight coefficient (i.e., the coefficient showing the signal-to-noise power ratio S/N of slot and the coefficient having the value based on measurement) are stored and it reads out the weight coefficient corresponding to the randomized value specified and outputs it. The calculation circuit 85 outputs the weight coefficient thus read out from the weight coefficient calculation table 86 to the multiplier 43 as the weight coefficient S43. Thus, the signal to noise power ratio S/N of slot is reflected to the received symbol S28 in the multiplier 43.

According to the foregoing construction, the demodulation circuit 70 in the third embodiment separates the received symbol S28 taken out by the multiplier 40 into I element and Q element and as well as calculating amplitude (S61) and power (S63) of I element for one slot from the I element of the received symbol S23, calculates the amplitude (S65) and the power (S67) of Q element for one slot from Q element of the received symbol S28. And then, based on the calculated amplitude and power of I element for one slot and the amplitude and the power of Q element, it calculates the randomized values of I and Q elements and based on said randomized values of I and Q elements, obtains the weight coefficient S43 showing the signal to noise power ratio S/N of slot and multiplies this by the received symbol S26. By conducting this processing per each slot, the signal to noise power ratio S/N of slot is reflected to the amplitude of the received symbol S28 and thus, the received symbol S29 reflecting the reliability of the slot is formed. And if such received symbol S29 reflected the reliability of slot would be entered into the Viterbi decoding circuit 16 of the succeeding stage, the Viterbi decoding circuit 16 can conduct the maximum likelihood sequence estimation upon adding the reliability of slot, and thereby the received data S32 can be restored with higher accuracy.

According to the foregoing construction, the amplitude S61 and the power S63 of I element and the amplitude S65 and the power S67 of Q element is obtained from the I element and Q element of the received symbol S28 and based on this, randomized values of I and Q elements are obtained, and based on those randomized values the weight coefficient S43 showing the signal to noise power ratio S/N of slot is calculated and multiplied by the received symbol S28, the reliability of the slot can be reflected to said received symbol S28. Thus, if the received symbol S29 reflected the reliability of slot would be fed into the Viterbi decoding circuit 16, the maximum likelihood sequence estimation can be conducted upon adding the reliability of each slot and the received data S32 can be restored with higher accuracy.

(4) The Fourth Embodiment

Figure 16:
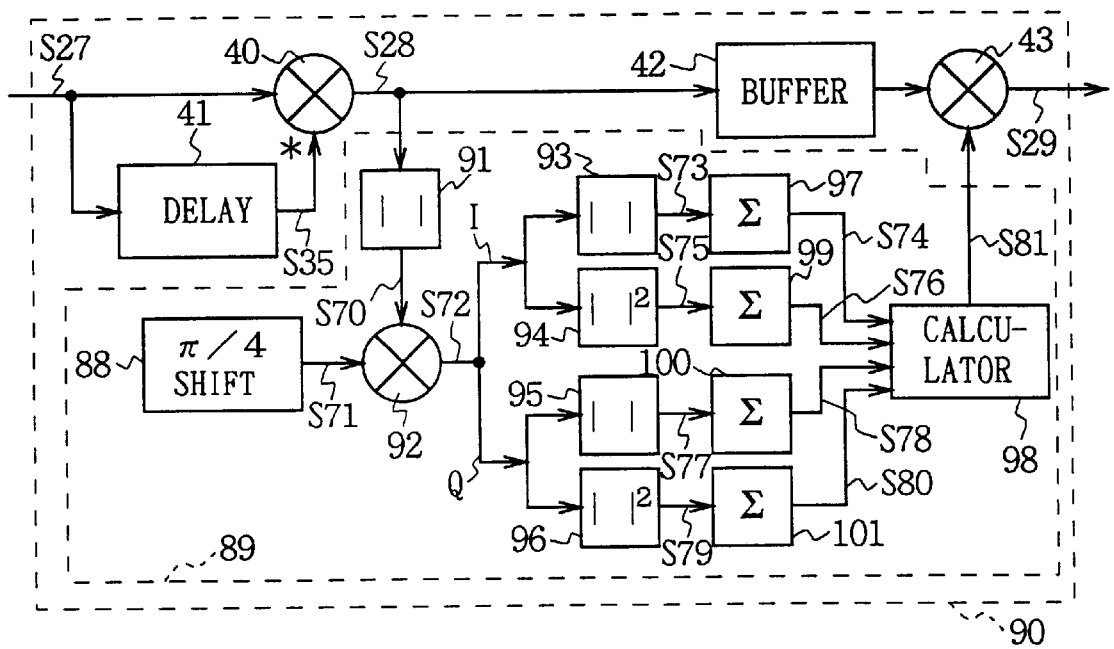
FIG. 16 is a block diagram showing a demodulation circuit according to the fourth embodiment.

In FIG. 16, in which corresponding parts of FIG. 8 are designated the same reference numerals, 90 generally shows a demodulation circuit according to the fourth embodiment. In the case of this embodiment, the weight coefficient is determined according to the effects of interference wave on the slot received. First, in this demodulation circuit 90, the received signal S27 is fed into the multiplier 40 and delay circuit 41 which comprise the DQPSK demodulation circuit. The multiplier 40 receives the received signal S35 transmitted from the delay circuit 41 and delayed for one symbol and by complex-multiplying the conjugate value of the one symbol preceding received signal S35 and the input received signal S27, extracts the received symbol S28 from said received signal S27. Provided that the received symbol S28 to be taken out by this multiplication processing is symbol information QPSK modulated. This received symbol S28 is fed into the following FIFO buffer 42 and successively stored. The FIFO buffer 42 holds this until the received symbol S28 is stored for one slot, and when one slot of received symbol S28 is stored, outputs this to the succeeding multiplier 43.

Furthermore, the received symbol S28 extracted by the multiplier 40 is fed into an absolute value circuit 91 included in a weight calculation unit 89. This absolute value circuit 91 converts the symbol information onto the upper right quadrant on the complex plane by taking the absolute value of I element and Q element of the received symbol S28 formed of QPSK signal and outputs converted received symbol S70 to a multiplier 92. In this multiplier 92, the phase data S71 to be output from the π/4 shift circuit 88 is entered. This phase data S71 is complex phase data of which the amplitude having +π/4 phase value is "1". The multiplier 92, complex-multiplying this phase data S71 by the received symbol S70, forms received symbol S72 of which the phase of the received symbol S70 is shifted by +π/4.

Figure 17:
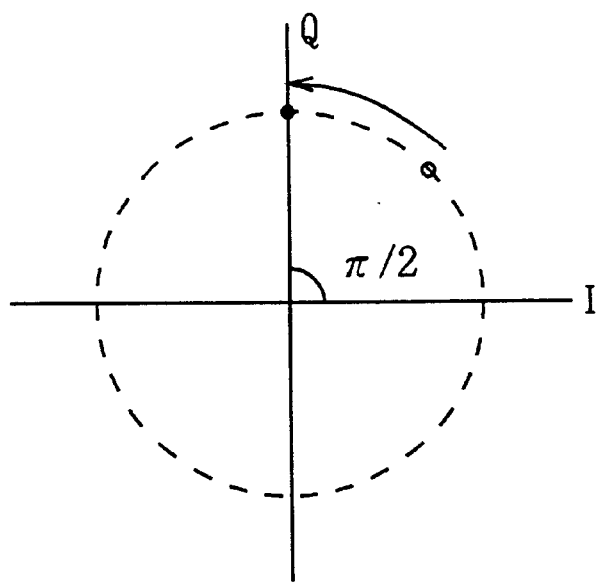
FIG. 17 is a brief linear diagram explaining the phase of received symbol transformed to the upper right quadrant on the complex plane when it is π/4 shifted.
Figure 18:
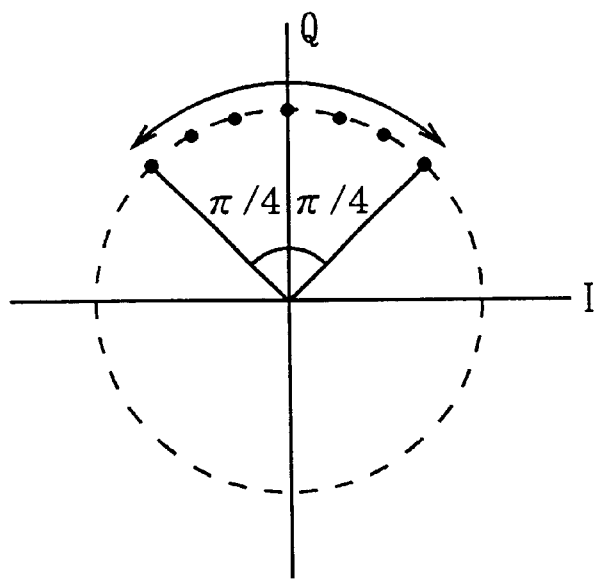
FIG. 18 is a schematic diagram explaining the phase when affected by the interference wave.

At this point, if the received symbol S70 is not affected by interference wave, as shown in FIG. 17, each symbol of the received symbol S72 moves to the position where the phase on the complex plane is π/2 and exists on the Q axis. accordingly, if the received symbol S70 is not affected by the interference wave, I element of each symbol becomes "0" and Q element becomes constant value. On the other hand, if the received symbol S70 is affected by the interference wave, each symbol of the received symbol S72 does not necessarily exist on the position where the phase is π/2, as shown in FIG. 18, but exists scattering randomly within the range of π/4 centering around π/2. The reason is that if the electric wave transmitted from the transmitting device other than the party communicating such as interference wave is received, phase does not return to the former condition even though the phase shift processing would be conducted by the random phase inverse shift circuit 32 and stays in the random state as it is. Accordingly, if the scattering condition of the phase value, i.e., the dispersion, shown by this received symbol S72 is detected, it becomes clear that the received symbol is affected by the interference wave or not.

Accordingly, the received symbol S72 obtained by the multiplier 92 is separated into I element and Q element in order to detect the dispersion and I element is fed to the second absolute value circuit 93 and the first square-law circuit 94, while Q element is fed to the third absolute value circuit 95 and the second square-law circuit 96. The second absolute value circuit 93, by obtaining the absolute value of I element, obtains the amplitude of said I element per symbol and outputs signal element S73 showing the amplitude of this I element to the first adder circuit 97. The first adder circuit 97 sums up the amplitude of I element for one slot by adding one slot of signal element S73 showing the amplitude of this I element and outputs signal element S74 showing the sum of amplitudes of that I element to the calculation unit 98.

The first square-law circuit 94 calculates power of I element per symbol by squaring the I element to be entered per symbol and outputs signal element S75 showing the power of I element per symbol to the second adder circuit 99. The second adder circuit 99 sums up powers of I element for one slot by adding one slot of this signal element S75 showing the power of I element per symbol and outputs signal element S76 showing the sum of powers of that I element to the calculation unit 98.

Similarly, the third absolute value circuit 95 in which Q element is entered obtains the amplitude of Q element per symbol by obtaining the absolute value of Q element, and outputs signal element S77 to show the amplitude of this Q element to the third adder circuit 100. The third adder circuit 100 sums up amplitude of Q element for one slot by adding one slot of signal element S77 showing the amplitude of this Q element and outputs signal element S78 showing the sum of amplitudes of that Q element to the calculation unit 98.

The second square-law circuit 96.calculates power of Q element per symbol by squaring the Q element per symbol and outputs signal element S79 showing the power of Q element per symbol to the fourth adder circuit 101. The fourth adder circuit 101, by adding one slot of the signal element S79 showing the power of Q element per symbol, sums up power of Q element for one slot and outputs signal element S80 showing the sum of power of that Q element to the calculation unit 98.

The calculation unit 98, as well as obtaining the dispersion value of I element based on the sum of amplitudes of I element to be entered (S74) and the sum of powers of I element (S76), obtains the dispersion value of Q element based on the sum of amplitude of Q element (S78) to be entered and the sum of power of Q element (S80) and calculates the weight coefficient S81 showing the degree that the slot is affected by interference wave (i.e., signal to interference wave power ratio S/I) based on the dispersion values of I element and Q element and outputs these to the multiplier 43. In this connection, if the dispersion value is large, this means that the effect of interference wave is significant, and the small value is selected as the weight coefficient S81. The multiplier 43, by multiplying the received symbol S28 to be sent out from the FIFO buffer 42 by this weight coefficient S81, causes the signal to interference wave power ratio S/I of the slot to be reflected to the amplitude of said received symbol S28. Thus, in the case of this embodiment, the reliability of slot can be reflected to the amplitude of received symbol S28 on a basis of the effect of interference wave.

Figure 19:
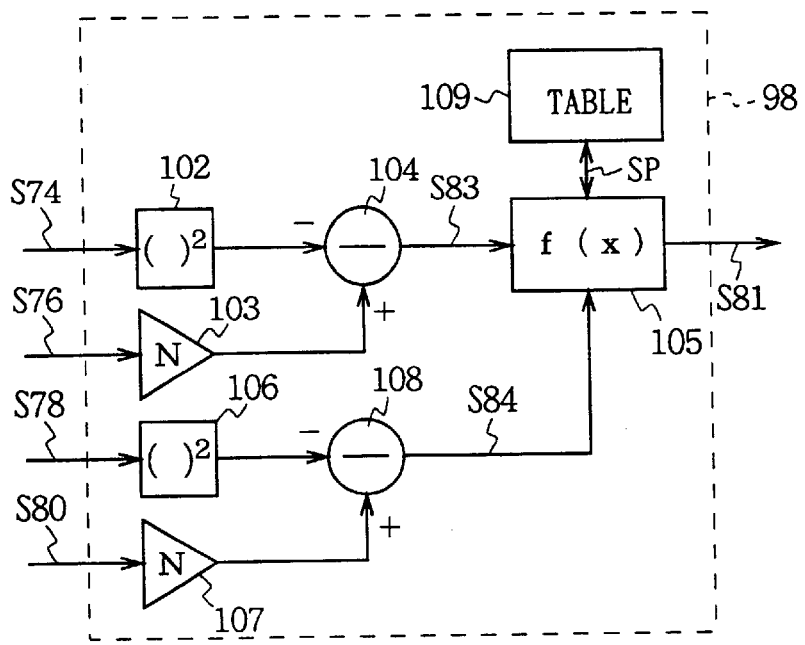
FIG. 19 is a block diagram showing a calculation unit of the demodulation circuit according to the fourth embodiment.

Here, the construction of the calculation unit 98 is shown in FIG. 19. As shown in this FIG. 19, in this calculation unit 98, the square of the amplitude of I element is obtained by inputting the signal element S74 showing the amplitude of I element into the third square-law circuit 102 and by inputting the signal element S76 showing the power of I element to the N-fold circuit 103, the power of I element is increased the number of symbols times. The resultant squared amplitude of I element and the power of I element increased the number of symbols-fold is fed respectively to the subtracter 104 and the squared amplitude of I element is subtracted from the number of symbols-fold power of I element and the dispersion value of I element is calculated. The signal element S83 showing the dispersion value of I element is transmitted to the succeeding calculation circuit 105.

Furthermore, the calculation unit 98, as well as inputting the signal element S78 showing the amplitude of Q element and obtaining the square of the amplitude of Q element, 106 inputs the signal element S80 showing the power of Q element to the N-fold circuit 107 and increases the power of Q element the number of symbols times. The resultant squared amplitude of Q element and the number of symbol-fold power of Q element is fed respectively to the subtracter 108, and the dispersion value of Q element can be calculated by subtracting the resultant amplitude squared from the number of symbols-fold power of Q element. This signal element S84 showing the dispersion value of Q element is transmitted to the following calculation circuit 105.

The calculation circuit 105 specifies dispersion values of input I element and Q element onto the weight coefficient calculation table 109 as a parameter for tabulation. A table showing the relationship between the dispersion value of I element and the dispersion value of Q element and corresponding weight coefficient (that is the coefficient showing the signal to interference wave power ratio S/I of the slot and the coefficient of the value based on the measurement) is stored in the weight coefficient calculation table 109, and the calculation circuit 105 reads out the weight coefficient corresponding to the specified dispersion value of I element and the dispersion value of Q element and outputs the weight coefficient thus read out from the weight coefficient calculation table 109 to the multiplier 43 as the weight coefficient S81. With this arrangement, at the multiplier 43 the signal to interference wave power ratio S/I of the slot is reflected to the amplitude of received symbol S28 and the reliability of slot can be reflected.

According to the foregoing construction, in the decoding circuit 90 according to the fourth embodiment, the received symbol S28 is transformed to the upper right quadrant on the complex plane by the absolute value circuit 91 and furthermore, the phase of transformed received symbol S70 is shifted $\pi/4$ by the multiplier 92. Then, after this phase transformed received symbol S72 is separated into I element and Q element, the sum of amplitudes of I element for one slot (S74) and the sum of powers of I element for one slot (S76) are obtained, and the sum of amplitudes of Q element for one slot (S78) and the sum of powers of Q element for one slot (S80) are obtained. And then, based on these calculation results (S74, S76, S78 and S80), the dispersion value of I element and the dispersion value of Q element are obtained, and based on this the weight coefficient S81 showing the signal to interference wave power ratio S/I of the slot is obtained and this is multiplied by the received symbol S28. And conducting this processing per slot, the signal-to-interference wave power ratio S/I is reflected to the amplitude of the received symbol S28 and received symbol S29 reflecting the reliability of slot is formed. If such received symbol S29 reflected the reliability of slot would be entered into the Viterbi decoding circuit 16 of the succeeding step, the maximum likelihood sequence estimation can be conducted upon adding the reliability of slot in said Viterbi decoding circuit 16, and the received data S32 can be restored with higher accuracy.

According to the foregoing construction, since after conducting the $\pi/4$ phase shift of the received symbol S70 which is transformed to the upper right quadrant on the complex plane, the dispersion values of I element and Q element from that phase converted received symbol S72 are obtained and based on the dispersion values of I element and Q element, the weight coefficient S81 showing the signal-to-interference wave power ratio S/I of the slot is calculated and multiplied by the received symbol S28, the reliability of the slot based on the interference wave can be reflected to said received symbol S28. Thus, if the received symbol S29 reflected the reliability of slot based on the interference wave would be fed to the Viterbi decoding circuit 16, the maximum likelihood sequence estimation can be conducted upon adding the reliability of each slot even in the circumstances where interference waves exist, and thereby the received data S32 can be restored with higher accuracy.

(5) The Fifth Embodiment

Figure 20:
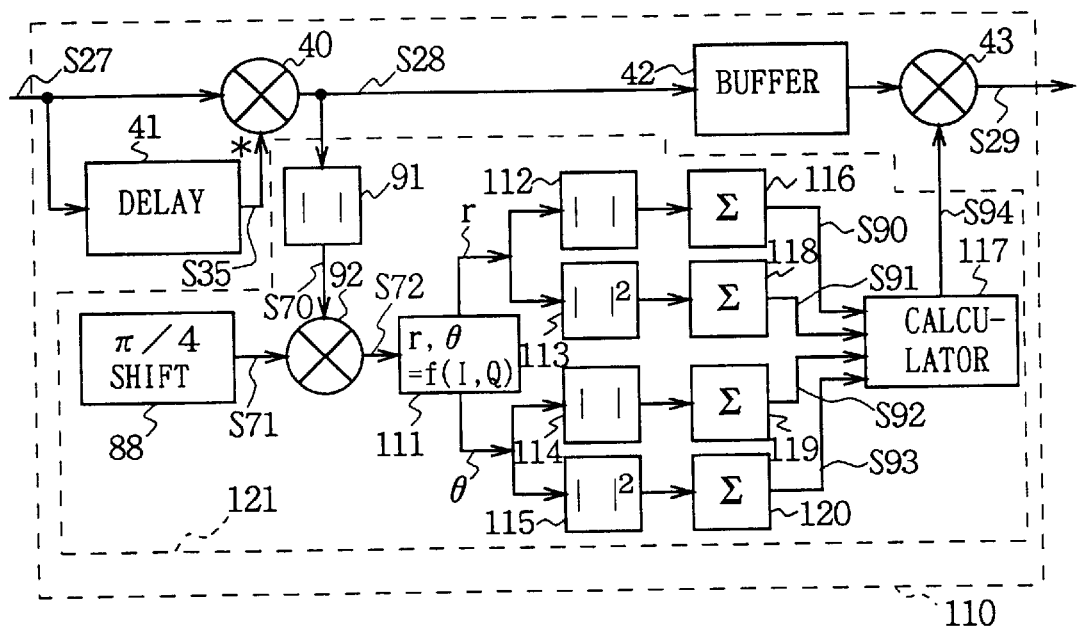
FIG. 20 is a block diagram showing a demodulation circuit according to the fifth embodiment.

In FIG. 20, in which corresponding parts of FIG. 16 are given the same reference numerals, 110 generally shows a demodulation circuit according to the fifth embodiment. In the case of this embodiment, received symbol S72 formed by the phase transform processing of the multiplier 92 would not be separated into I element and Q element but the received symbol S72 is turned into amplitude element r and phase element $\theta$ by the polar coordinate transformation and the weight coefficient is calculated based on this.

First, in the weight coefficient calculation unit 121, the received symbol S72 obtained by the multiplier 92 and its phase is $\pi/4$ shifted is put into the polar coordinate transforming circuit 111. The polar coordinate transforming circuit 111, applying the polar coordinate transformation to the received symbol S72, extracts the amplitude element r of the received symbol S72 and the phase element $\theta$ on the complex plane per symbol and outputs said amplitude element r to the second absolute value circuit 112 and the first square-law circuit 113 and outputs the phase elements $\theta$ to the third absolute value circuit 114 and the second square-law circuit 115.

The second absolute value circuit 112 obtains the absolute value of amplitude element r and outputs this to the first adder circuit 116. The first adder circuit 116 obtains the sum of amplitude element r for one slot by adding one slot of absolute value of the amplitude element r and outputs the signal element S90 showing the sum of the amplitude element r for one slot to the calculation unit 117. The first square-law circuit 113 calculates the power element by squaring the amplitude element r per symbol and outputs this to the second adder circuit 118. The second adder circuit 118 obtains the sum of power for one slot by adding one slot of power element and outputs the signal element S91 showing the sum of power for one slot to the calculation unit 117.

On the other hand, the third absolute value circuit 114 obtains the absolute value of phase element θ and outputs this to the third adder circuit 119. The third adder circuit 119 obtains the sum of phase element θ for one slot by adding one slot of phase element θ and outputs the signal element S92 showing the sum of phase element θ for one slot to the calculation unit 117. The second square-law circuit 115 squares the phase element θ per symbol and outputs the squared resultant to the fourth adder circuit 120. The fourth adder circuit 120 adds the squared resultant of the phase element θ for one slot and outputs the signal element S93 showing the sum of that squared resultant for one slot to the calculation unit 117.

The calculation unit 117, as well as obtaining the dispersion value of the amplitude elements r based on the sum of amplitude elements r (S90) and the sum of amplitude element r squared (S91), obtains the dispersion value of the phase element θ based on the sum of phase elements θ (S92) and the sum of phase element θ squared (S93) and tabulates the weight coefficient based on the dispersion value of this amplitude element r and the dispersion value of phase element θ, and outputs this to the multiplier 43 as the weight coefficient S94. In this connection, also in the case of this embodiment, the calculation unit 117 has a weight coefficient calculation table consisting of a table showing the relation between the dispersion value of amplitude element r and the dispersion value of phase element θ and the corresponding weight coefficient (i.e., the coefficient to show the signal to interference wave power ratio S/I of slot), and calculates the desired weight coefficient S94 by tabulating the weight coefficient calculation table based on the dispersion value of amplitude element r and the dispersion value of phase element θ.

According to the foregoing construction, in the demodulation circuit 110, the amplitude element r and the phase element θ are extracted by the polar coordinate transforming the received symbol S72, and the dispersion values of said amplitude element r and phase element θ are obtained. And based on the dispersion values of this amplitude element r and the phase element, the weight coefficient S94 showing the signal to interference wave power ratio S/I of slot is calculated and this is multiplied by the received symbol S28. By conducting this processing per slot, the signal-to-interference wave power ratio S/I is reflected to the amplitude of received symbol S28 and received symbol S29 reflected the reliability of slot is formed. If such received symbol S29 reflecting the reliability of slot would be entered into the Viterbi decoding circuit 16 of the later stage, said Viterbi decoding circuit 16 can conduct the maximum likelihood sequence estimation upon adding the reliability of each slot, and the received data S32 can be decoded with higher accuracy.

In this connection, in the case of this embodiment, since the dispersion values are obtained after conducting the polar coordinate transformation onto the received symbol S72 and extracting the amplitude element r and the phase element θ, the dispersion values can be detected more accurately than in the case of fourth embodiment. Accordingly, the degree of influence of interference wave can be detected more precisely according to this embodiment, and the reliability can be reflected to the received symbol S28 more precisely.

According to the foregoing construction, since the received symbol S72 is polar coordinate transformed and the amplitude element r and the phase element θ are extracted, and as well as obtaining the dispersion value of the phase element θ, the dispersion value of said amplitude element r is obtained, and based on these, upon calculating the weight coefficient S94 showing the signal to interference wave power ratio S/I of the slot, this is multiplied by the received symbol S28, the reliability of slot based on the interference wave can be reflected to said received symbol S28. Thereby, if the received symbol S29 reflected the reliability of slot based on the interference wave would be fed to the Viterbi decoding circuit 16, even in the circumstances in which interference waves are present, the maximum likelihood sequence estimation can be conducted upon adding the reliability of each slot and the received data S32 can be restored with further improved accuracy.

(6) The Sixth Embodiment

Figure 21:
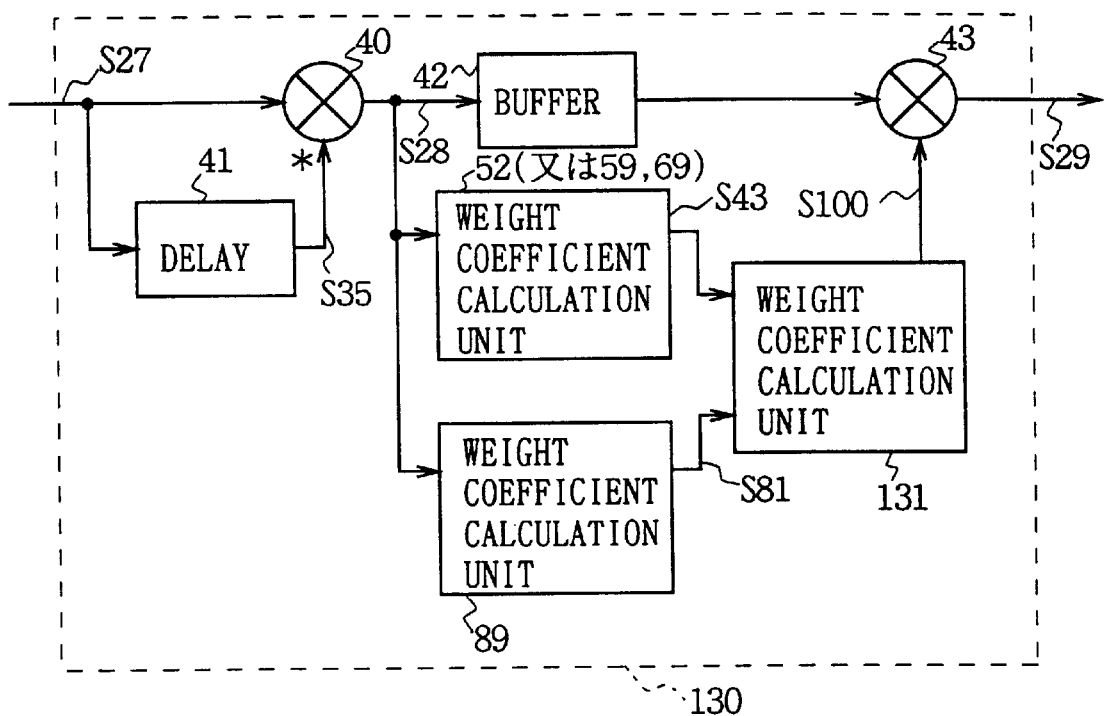
FIG. 21 is a block diagram showing a demodulation circuit according to the sixth embodiment.

In FIG. 21, in which corresponding parts of FIGS. 8 and 16 are designated the same reference numerals, 130 generally shows a demodulation circuit according to the sixth embodiment. In the case of this embodiment, the weight coefficient is calculated by using either one of weight coefficient calculating units 52, 59 or 60 shown in the first, second or the third embodiment and the combination of the weight coefficient calculation unit 89 shown in the fourth embodiment. Such demodulation circuit 130 is suitably applied to the circumstances in which both noise and interference wave exist and the circumstances in which strong single interference wave occurs suddenly even though normally the interference wave becomes noise.

At first, in this demodulation circuit 130, the received signal S27 is fed to the multiplier 40 and the delay circuit 41 which comprise the DQPSK demodulation circuit. The multiplier 40 receives the received signal S35 which is transmitted from the delay circuit 41 and delayed for one symbol and by complex-multiplying the conjugate values of the one symbol preceding received signal S35 and input received signal S27, extracts received symbol S28 from said received signal S27. However, the received symbol S28 to be taken out by this multiplication processing is the QPSK modulated symbol information. This received symbol S28 is fed to the succeeding FIFO buffer 42 and successively stored. The FIFO buffer holds the received symbol S28 until it is stored for one slot and when one slot of received symbol S28 is stored, it outputs said received symbol S28 to the following multiplier 43.

Furthermore, the received symbol S28 taken out by the multiplier 40 is fed to the first weight coefficient calculation unit 52 and also to the second weight coefficient calculation unit 89. Here, since the weight coefficient calculation unit 52 according to the first embodiment is used as the first weight coefficient calculation unit, the weight coefficient calculation unit 59 or 69 according to the second or the third embodiment may be used. Also the second weight coefficient calculation unit is the weight coefficient calculation unit 89 according to the fourth embodiment.

The first weight coefficient calculation unit 52 forms a replica of received signal S37 by temporarily confirming the received symbol S28 as in the first embodiment, and obtains noise power S40 according to the difference between the replica received signal S37 and the original received signal S27. Then, the first weight coefficient calculation unit 52, tabulating based on the noise power S40 and signal power S42 of the received signal S27, calculates the weight coefficient S43 showing the signal to noise power ratio S/N of slot and outputs this to the third weight coefficient calculation unit 131.

On the other hand, the second weight coefficient calculation unit 89, as in the case of fourth embodiment, after transforming the received symbol S28 to the upper right quadrant on the complex plane, shifts the phase π/4 and forms received symbol S72 whose phase condition is centering around Q axis on the complex plane. And the second weight coefficient calculation unit 89 extracts I element and Q element from this received symbol S72 and calculates the dispersion value of said I element and the dispersion value of the Q element, and based on these, tabulating these, it calculates the weight coefficient S81 showing the signal to interference wave power ratio S/I of the slot and outputs this to the third weight coefficient calculation unit 131.

The third weight coefficient calculation unit 131, based on the signal-to-noise power ratio S/N of slot showing the weight coefficient S43 and the signal-to-interference wave power ratio S/I of slot showing the weight coefficient S81, calculates the weight coefficient showing the signal-to-interference noise power ratio S/(I+N) in which both elements are combined, and outputs this to the multiplier 43 as a new weight coefficient S100. Thus, by multiplying the weight coefficient S100 which contains two elements by the received symbol S28, the multiplier 43 makes the signal-to-interference noise power ratio S/(I+N) to be reflected to the amplitude of the received symbol S28, and considering both elements, forms received symbol S29 reflected the reliability of slot.

In the third weight coefficient calculation unit 131, in the case of calculating the weight coefficient S100 showing the signal-to-interference noise power ratio S/(I+N), tabulation is conducted based on two weight coefficient values S43 and S81, and the weight coefficient S100 is obtained accordingly. More specifically, where the value of weight coefficient S43 is L and the value of weight coefficient S81 is M, and a table that can tabulate based on these values L and M, such as shown in FIG. 22 is prepared in advance, and by inputting values L and M to this table, corresponding weight coefficient S100 is calculated. For example, if the value L of the weight coefficient S43 is "1" and the value M of the weight coefficient S81 is "5", the weight coefficient having the value EA is calculated. The values AA to HH shown in FIG. 22 are estimated values of signal-to-interference power ratio S/(I+N) obtained in advance respectively by measurements.

According to the foregoing construction, since based on the weight coefficient S43 showing the signal-to-noise power ratio S/N of slot calculated by the first weight coefficient calculation unit 52 and the weight coefficient S81 showing the signal-to-interference wave power ratio S/I of slot calculated by the second weight coefficient calculation unit 89, the weight coefficient S100 to show the signal-to-interference noise power ratio S/(I+N) in which both elements are combined is calculated and multiplied by the received symbol S28, the reliability of slot can be correctly calculated and reflected to the received symbol S28 in the circumstances in which both noise and interference wave exist. Thus, the received data can be restored with higher accuracy even in the Viterbi decoding circuit 16.

(7) The Seventh Embodiment

Figure 23:
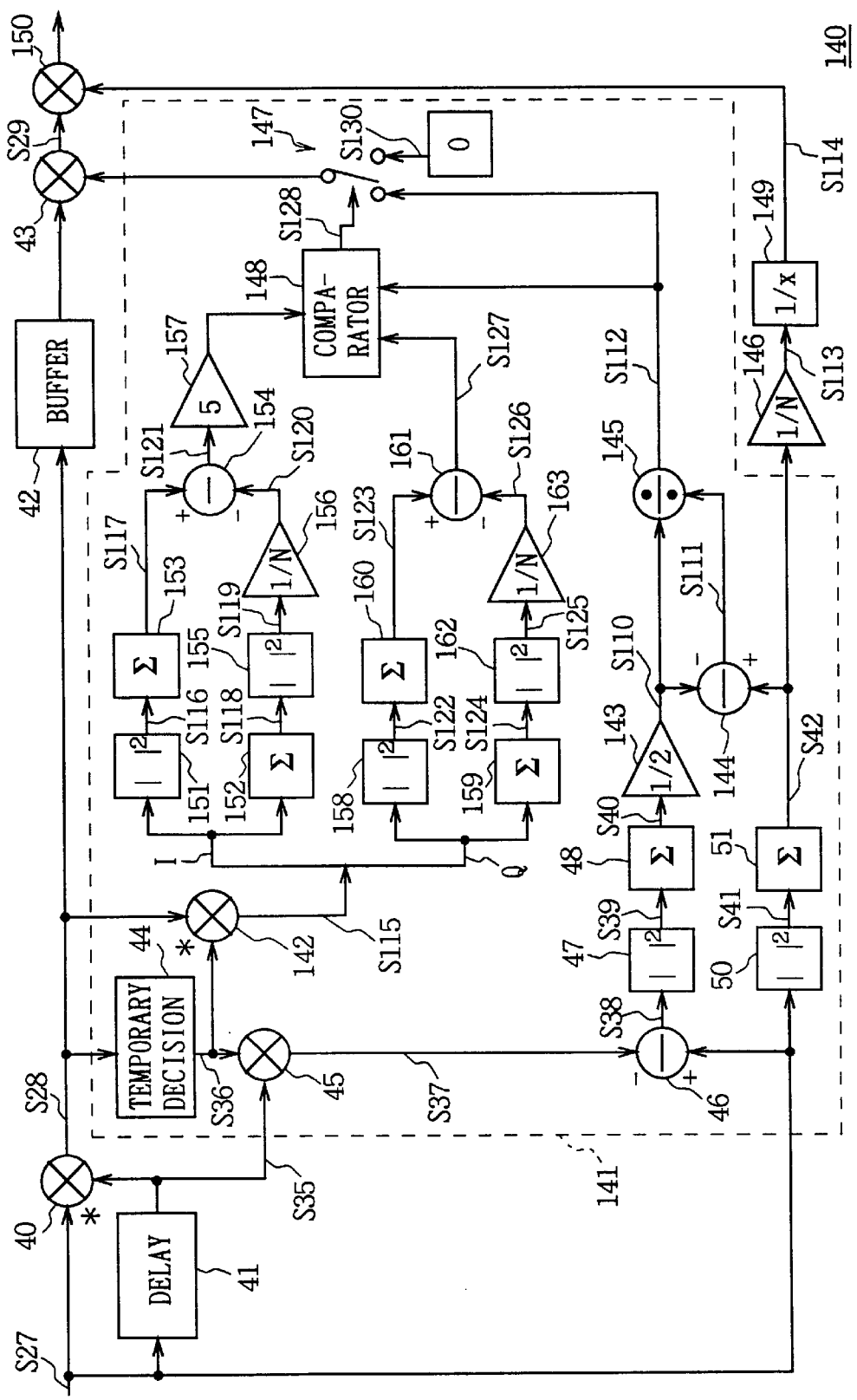
FIG. 23 is a block diagram showing a demodulation circuit according to the seventh embodiment.

In FIG. 23, in which corresponding parts of FIG. 8 are given the same reference numerals, 140 generally shows a demodulation circuit according to the seventh embodiment. Also in the case of this embodiment, the weight coefficient is calculated considering the noise element and interference element contained in the received signal S27 just as in the case of sixth embodiment.

First, in this demodulation circuit 140, the received signal S27 is fed to the multiplier 40 and delay circuit 41 comprising the DQPSK demodulation circuit. The multiplier 40 receives the received signal S35 delayed for one symbol transmitted from the delay circuit 41 and by complex-multiplying the conjugate value of the one symbol preceding received signal S35 by the input received signal S27, extracts received symbol S28 from said received signal S27. Provided that the received symbol S28 to be taken out by this multiplication processing is the QPSK modulated symbol information. This received symbol S28 is fed to the following FIFO buffer 42 and successively stored. The FIFO buffer 42 holds the received symbol S28 until it stores for one slot and when one slot of received symbol S28 is stored, outputs said received symbol S28 to the following multiplier 43.

Furthermore, the received symbol S28 taken out by the multiplier 40 is fed to the temporary decision circuit 44 comprising the weight coefficient calculation unit 141. This temporary decision circuit 44 is a circuit to temporarily determine in which phase condition the received symbol S28 is in from among four phase conditions of QPSK and outputs complex signal S36 of which the amplitude showing the phase condition temporarily determined is "1" to the multiplier 45 and the multiplier 142.

The received signal S35 delayed for one symbol and to be sent from the delay circuit 41 is fed to the multiplier 45, and this multiplier 45, multiplying the complex signal S36 from the temporary decision circuit 44 by the received signal S35 delayed for one symbol based on the temporary decision result, forms DQPSK modulated signal, i.e., reproduced received signal S27, replica received signal S37 and outputs this to the subtracter 46.

Also, the original received signal S27 is fed to the subtracter 46, and said subtracter 46 subtracts the replica received signal S37 from the original received signal S27 and outputs signal element S38 showing the subtraction result to the first square-law circuit 47. In this case, if the decision result of the temporary decision circuit 44 were correct, this signal element S38 becomes the signal in which noise element contained in the received signal S27 when the temporary decision is made and the noise element contained in one symbol preceding received signal S27 are combined.

The first square-law circuit 47 obtains the power of noise element per symbol by squaring the amplitude of signal element S38 per symbol, and output the noise power S39 to the first adder circuit 48. The first adder circuit 48 obtains noise power S40 for one slot by adding the noise power S39 and outputs this to 1/2 circuit 143. As described above, since this noise power S40 is made up of the sum of noise power S39 for two symbols, the 1/2 circuit 143 halves this noise power S40 and outputs the resulting noise power S110 to the subtracter 144 and the divider 145.

The received signal S27 is also fed to the second square-law circuit 50. This second square-law circuit 50 obtains the power of received signal S27 per symbol by squaring the amplitude of this received signal S27 and outputs the signal power S41 to the second adder circuit 51. The second adder circuit 51 obtains signal power S42 for one slot by adding that signal power S41 and outputs this to the subtracter 144. In this connection, this signal power S42 shows the signal power of the received signal S27 and is the signal power in which the actual power of signal element and the power of noise element are combined.

The subtracter 144 obtains pure signal power S111 from which noise power is eliminated by subtracting the noise power S110 from the signal power S42 and outputs this to the divider 145. Then, the divider 145 calculates the signal to noise power ratio S/N of the slot by dividing this signal power S111 by the noise power S110 and outputs this to the select switch 147 and the comparator 148 which are described later as the weight coefficient S112.

In the select switch 147, this weight coefficient S112 is fed to the first input terminal, while the weight coefficient S130 having the value "0" is fed to the second input terminal. This select switch 147 generally selects the weight coefficient S112 and output it to the multiplier 43, however, when the control signal S128 is sent out from the comparator 148, it selects the weight coefficient S130 and outputs this in place of the weight coefficient S112. The multiplier 43 multiplies the weight coefficients S112 or S130 to be sent out from the select switch 147 to the received symbol S28 to be put out from the FIFO buffer 42. Thus, the received symbol S29 reflected the reliability of slot can be formed.

In this connection, the signal power S42 formed by the second adder circuit 51 is also fed to the 1/N circuit 146. This 1/N circuit 146 calculates signal power S113 per one symbol by dividing the signal power S42 by the number of symbols of one slot and outputs this to a reciprocal calculation circuit 149. The reciprocal calculation circuit 149 calculates the reciprocal value S114 of this signal power S113 and outputs this to the multiplier 150. This multiplier 150, by multiplying each symbol of the received symbol S29 by this reciprocal value S114, normalizes the power of each symbol of said received symbol S29. Thus, even in the case where the power of each slot could not be made completely even in the received circuit 31, the power of each slot can be made even by the normalization and the scattering of power per slot can be eliminated. In this connection, the reason of equalizing the power of each slot is that if the power scatters slot-by-slot, it is not clear whether the low signal level is caused by poor reliability of slot or caused by the low electric power, and the received data 32 cannot be restored correctly in the Viterbi decoding circuit 16 of the later stage.

Figure 24:
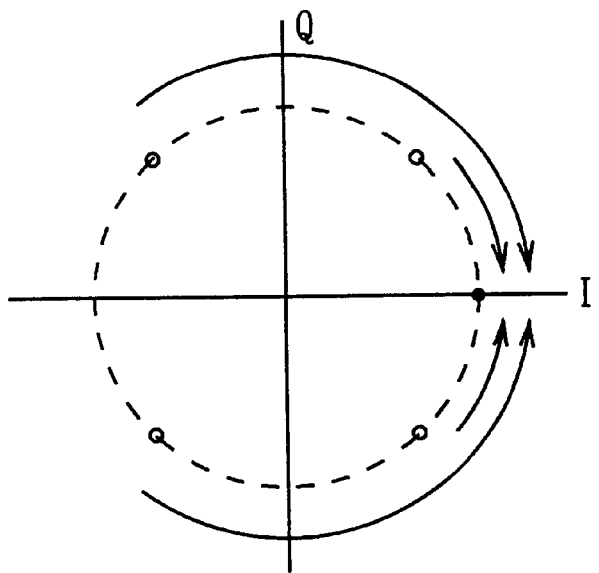
FIG. 24 is a schematic diagram explaining the received symbol when shifted onto I axis on the complex plane.
Figure 25:
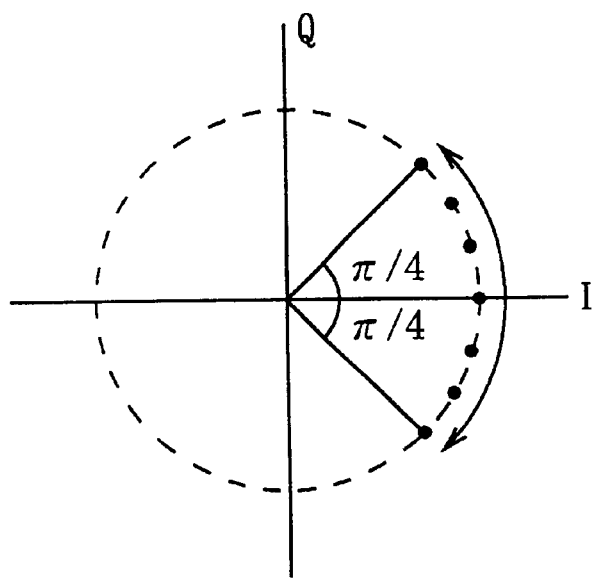
FIG. 25 is a schematic diagram explaining the case when receiving the interference wave.

On the other hand, in said multiplier 142 into which the complex signal S36 is supplied, also the received symbol S28 is entered. This multiplier 142, by complex-multiplying the conjugate value of complex signal S36 showing the phase of received symbol S28 by said received symbol S28, forms received symbol S115 of which the phase of said received symbol S28 is shifted. And if the received symbol S28 is not affected by the interference wave, each symbol of this received symbol S115, as shown in FIG. 24, exists on the position at which phase on the complex plane is zero where Q element becomes "0" and I element becomes the fixed value, i.e., on I axis. On the other hand, if the received symbol S28 is affected by interference wave, as shown in FIG. 25, each symbol of the received symbol S115 does not necessarily exist on I axis, but exists scattering randomly within $\pi/4$ area centering around the I axis. Accordingly, if the degree of scattering of phase values shown by the received symbol S115, i.e., dispersion would be detected, signal-to-interference wave power ratio S/I can be found. Accordingly, this received symbol S115 after being separated into I element and Q element, is fed to the following circuit for calculating the signal to interference wave power ratio S/I.

First of all, I element of the received symbol S115 is fed to the third square-law circuit 151 and the third adder circuit 152. The third square-law circuit 151 obtains the power of I element of each symbol by squaring the amplitude of I element per symbol and outputs signal element S116 showing the power of I element of each symbol to the fourth adder circuit 153. The fourth adder circuit 153 calculates the power of I element for one slot by adding one slot of signal element S116 and outputs signal element S117 showing the power of I element for one slot to the subtracter 154.

On the other hand, the third adder circuit 152 obtains the added value of amplitude of I element by adding the amplitude of I element for one slot and outputs a signal element S118 showing this added value to the fourth square-law circuit 155. The fourth square-law circuit 155, squaring this signal element S118, obtains squared value of amplitude of I element and outputs a signal element S119 showing this squared value to the 1/N circuit 156. The 1/N circuit 156 divides this signal element S119 by the number of symbols of one slot and outputs a signal element S120 showing the divided result to the subtracter 154. Then, in the subtracter 154, by subtracting the signal element S120 from the signal element S117, the dispersion value of I element can be obtained. The signal element S121 showing the dispersion value of this I element is increased 5-fold by the succeeding 5-fold circuit 157 and fed to a comparator 148.

On the other hand, Q element of the received symbol S115 is supplied into the fifth square-law circuit 158 and the fifth adder circuit 159. The fifth square-law circuit 158, by making the amplitude of Q element squared per symbol, obtains the power of Q element of each symbol and outputs a signal element S122 showing the power of Q element of each symbol to the fifth adder circuit 160. The fifth adder circuit 160 calculates one slot of power of Q element by adding one slot of this signal element S122 and outputs a signal element S123 showing the power of Q element for one slot to a subtracter 161.

The fifth adder circuit 159 obtains the added value of amplitude of Q element by adding one slot of amplitude of Q element of each symbol, and outputs a signal element S124 showing this added value to the sixth square-law circuit 162. The sixth square-law circuit 162 obtains the squared value of amplitude of Q element by squaring this signal element S124 and outputs a signal element S125 showing this squared value to the 1/N circuit 163. The 1/N circuit 163 divides this signal element S125 by the number of symbols of one slot and a signal element S126 showing its resultant to a subtracter 161. Thus, in the subtracter 161, the dispersion value of Q element is obtained by subtracting the signal element S126 from the signal element S123. The signal element S127 showing the dispersion value of this Q element is transmitted to the comparator 148.

The comparator 148 judges whether the dispersion value of Q element is more than 5-fold of the dispersion value of I element or not based on the signal element S121 and the signal element S127. If the dispersion value of Q element becomes larger and exceeds I element, it judges that the signal-to-interference wave power ratio S/I is lower than −10[dB] and outputs a control signal S128 to a select switch 147. Thus, when the received signal S27 is affected by strong interference waves, it decreases the reliability of the received symbol S28 by outputting the weight coefficient S130 having the value "0" and the fact that the received signal S27 is affected by strong interference waves can be reflected to the received symbol S28.

Figure 26:
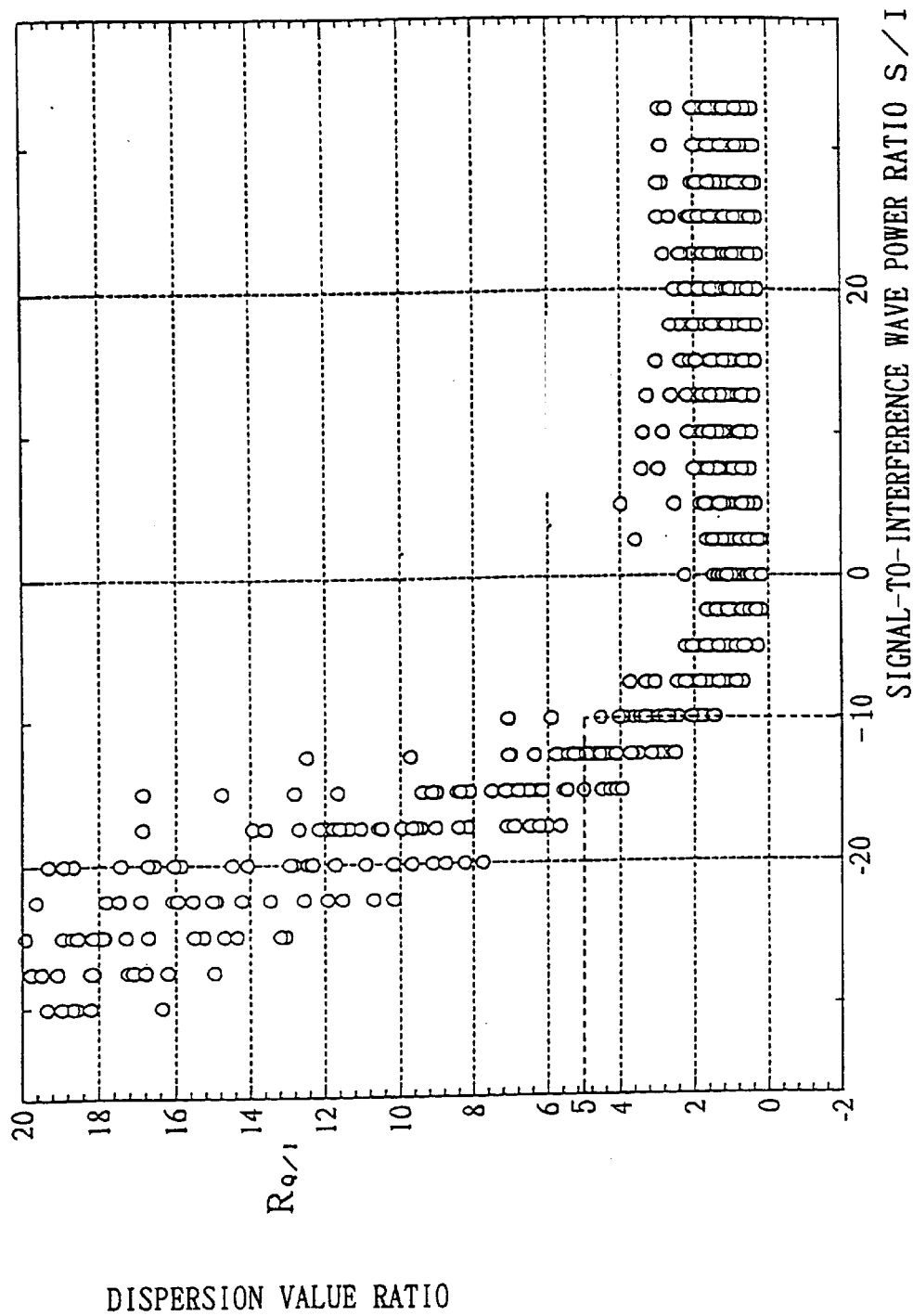
FIG. 26 is a characteristic curvilinear diagram showing the relationship between the dispersion value ratio $R_{Q/I}$ and the signal-to-interference wave ratio S/I.

In this connection, the reason of making the fact whether the dispersion value of Q element exceeds five times of the dispersion value of I element or not as a criterion of judgement of whether the received signal is affected by strong interference waves or not is based on actual measurement. More specifically, the dispersion value of Q element is divided by the dispersion value of I element, and let the resulting value to be the dispersion value ratio $R_{Q/I}$, and where the relation between this dispersion value ratio $R_{Q/I}$ and the signal to interference wave power ratio S/I is calculated by an experiment, the relation as shown in FIG. 26 exists. As it is clear from this FIG. 26, when the dispersion value ratio $R_{Q/I}$ exceeds the value "5", the signal to interference wave power ratio S/I becomes lower than −10 [dB] and it is apparent that it is affected by strong interference waves.

The weight coefficient S112 showing the signal to noise power ratio S/N is fed to this comparator 148, and in the case where the signal to noise power ratio S/N is judged that it exceeds 10 [dB] by the weight coefficient S112, said comparator 148 will not output the control signal S128 even though the dispersion value of Q element becomes larger. Thus, the weight coefficient S130 with the value "0" can be prevented from being erroneously selected even though the signal-to-noise power ratio S/N is over 10 [dB] and the quality of communication is satisfactory and the lowering of reliability of received symbol S28 can be also prevented.

According to the foregoing construction, in the case of demodulation circuit 140 according to this seventh embodiment, the received symbol S28 is tentatively decided and based on the temporary decision result S36 and one symbol preceding received signal S27, a replica received signal S37, that is a replicated received signal S27 is formed. And by taking the difference between this replica received signal S37 and the original received signal S27, the noise element S38 per symbol is obtained, and based on this, the noise power S110 for one slot is obtained. Moreover, signal power S42 of the received signal S27 for one slot is obtained and by subtracting the noise power S110 from that signal power S42, pure signal power S111 is obtained. Then, by dividing this signal power S111 by the noise power S110, the signal-to-noise power ratio S/N of the slot is obtained and output to the multiplier 43 via the selection switch 147 as the weight coefficient S112 and said weight coefficient S112 is multiplied by the received symbol S28. Thus, the signal-to-noise power ratio S/N of the slot can be reflected to the received symbol S28.

Moreover, in tandem with this, by multiplying the received symbol S28 by the conjugate value of the temporary decision result S36 of the received symbol S28, the received symbol S115 of which phase of symbol is shifted in the vicinity of I axis is formed, and the dispersion value S121 of I element of slot and the dispersion value S127 of Q element are obtained from said received symbol S115. Then, the comparator 148 judges whether the dispersion value of Q element exceeds five times the dispersion value of I element or not, and as a result, if the dispersion value of Q element exceeds the I element, it judges that the slot is affected by strong interference wave and outputs control signal S128, and shifts the weight coefficient S112 to the weight coefficient S130 having the value "0". Thus, in the case where the slot is affected by strong interference wave, the reliability of said received symbol S28 is decreased by multiplying the received symbol S28 by the weight coefficient S130 with the value "0", and the fact that it is affected by strong interference wave is reflected to the received symbol S28.

Accordingly, in the case of this demodulation circuit 140, considering the noise element and interference wave element contained in the received signal S27, the reliability is reflected to the received symbol S28 based on the noise element and interference element. Thus, if the received symbol S29 reflected such reliability would be fed into the Viterbi decoding circuit 16 of the later stage, said Viterbi decoding circuit 16 can conduct the maximum likelihood sequence estimation upon adding the reliability, and if it is suddenly affected by strong interference wave, the received data S32 can be restored accurately without restoring the interference wave erroneously.

According to the foregoing construction, since the signal-to-noise power ratio S/N of the slot is obtained from the received symbol S28 and reflecting this to said received symbol S28, in the case where the effect of interference is found based on the dispersion values of I and Q elements obtained from the received symbol S28, the effect of said interference is reflected to the received symbol S28, the reliability taking both noise element and interference wave element into consideration can be reflected to the received symbol S28.

(8) The Eighth Embodiment

Figure 27:
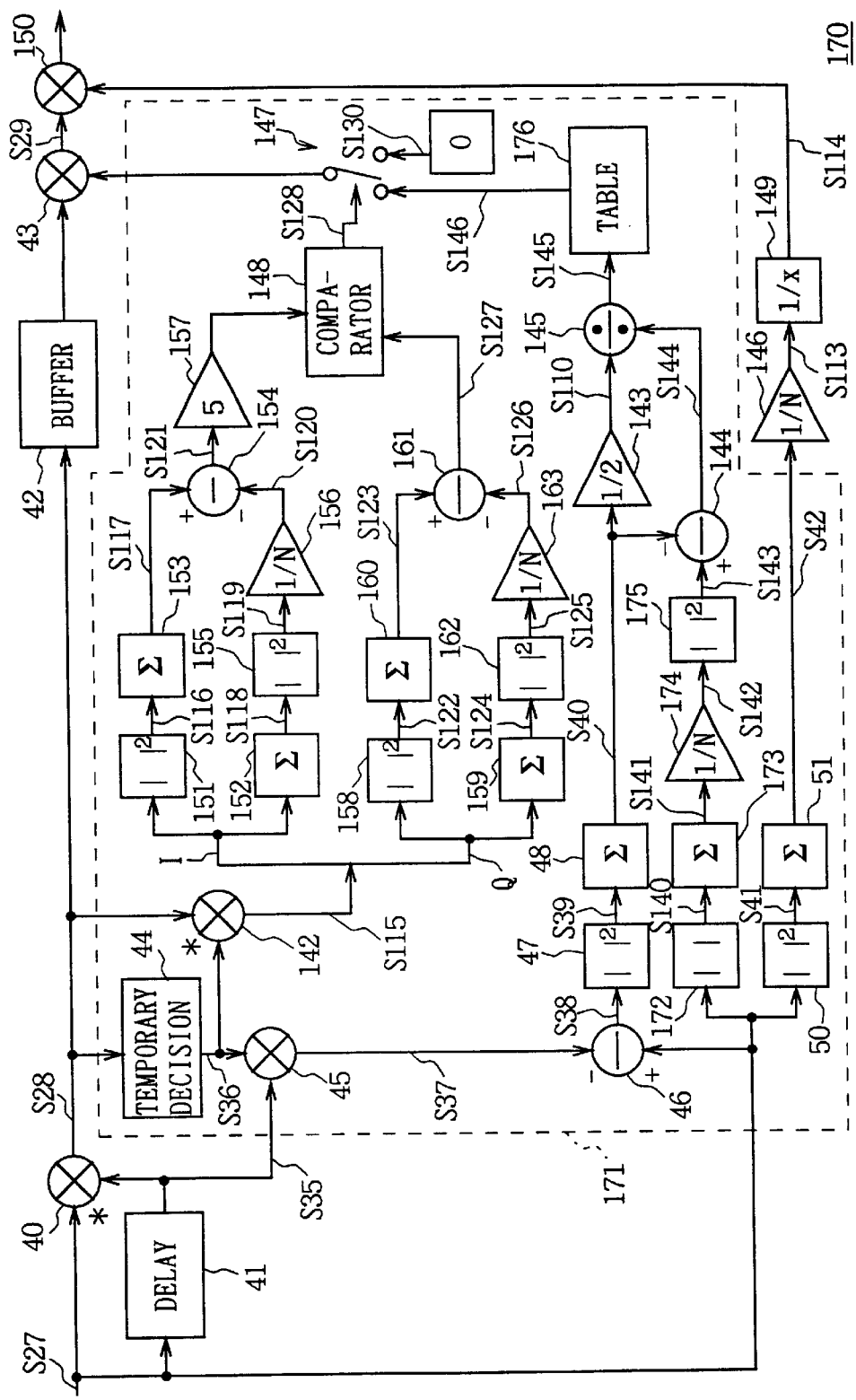
FIG. 27 is a block diagram showing a demodulation circuit according to the eighth embodiment.

In FIG. 27, in which corresponding parts of FIG. 23 are designated the same reference numerals, 170 generally shows a demodulation circuit according to the eighth embodiment. In the case of this embodiment, the part to obtain the signal to noise power ratio S/N is different with respect to the demodulation circuit 140 shown in the seventh embodiment and also the weight coefficient calculation method is different.

In this demodulation circuit 170, the signal element S38 showing the noise element calculated by the subtracter 46 is input to the first square-law circuit 47. The first square-law circuit 47 obtains the power of noise element per symbol by squaring the amplitude of the signal element S38 per symbol and outputs the noise power S39 to the first adder circuit 48. The first adder 48 obtains one slot of noise power S40 by adding the noise power S39 and outputs this to the I/N circuit 178. The I/N circuit 178, obtains noise power S149 per symbol by dividing the noise power S40 by the number of symbols N, and outputs this to the 1/2 circuit 143 and subtracter 144. Since the noise power S40 is the sum of two symbols of noise power S39 as described above, the 1/2 circuit 143 halves this noise power S149 and outputs the resultant noise power S110 to a divider 145.

On the other hand, the received signal S27 is fed to an absolute value circuit 172. This absolute value circuit 172 obtains the amplitude of said received signal S27 by obtaining the absolute value of the received signal S27 and outputs signal element S140 showing this amplitude to an adder circuit 173. The seventh adder circuit 173 calculates the sum of amplitude for one slot by adding this signal element S140 for one slot and outputs signal element S141 showing the sum of this amplitude to the 1/N circuit 174. The 1/N circuit 174 calculates the average amplitude by dividing this signal element S141 by the number of symbols of one slot and outputs signal element S142 to show this average amplitude to the seventh square-law circuit 175. The 7th square-law circuit 175 calculates the average power S143 per symbol of the received signal S27 by squaring this signal element S142 and outputs this to a subtracter 144.

The subtracter 144 calculates pure signal power S144 eliminated the noise element by subtracting the noise power S149 from the average power S143 of the received signal S27 and outputs this to a divider 145. With this arrangement, the divider 145 obtains, the signal-to-noise power ratio S/N of slot by dividing the signal power S144 by the noise power S110 and outputs signal element S145 showing the signal-to-noise power ratio S/N to the weight coefficient calculating table 176.

In the weight coefficient calculation table 176, a table of signal element S145 and corresponding signal to noise power ratio S/N based on measurement is stored, and at the time when signal element S145 is supplied from the divider 145, corresponding signal to noise power ratio S/N is read out and this is output as the weight coefficient S146. This weight coefficient S146 is fed to the multiplier 43 via a select switch 147 as in the case of 7th embodiment and multiplied by the received symbol S28. Accordingly, also in the case of this embodiment, the reliability based on the signal to noise power ratio S/N of slot can be reflected to the received symbol S28. In this connection, the value of signal element S145 may be supplied to the select switch 147 as the weight coefficient S146 not conducting the tabulation using the weight coefficient calculation table 176.

Figure 28:
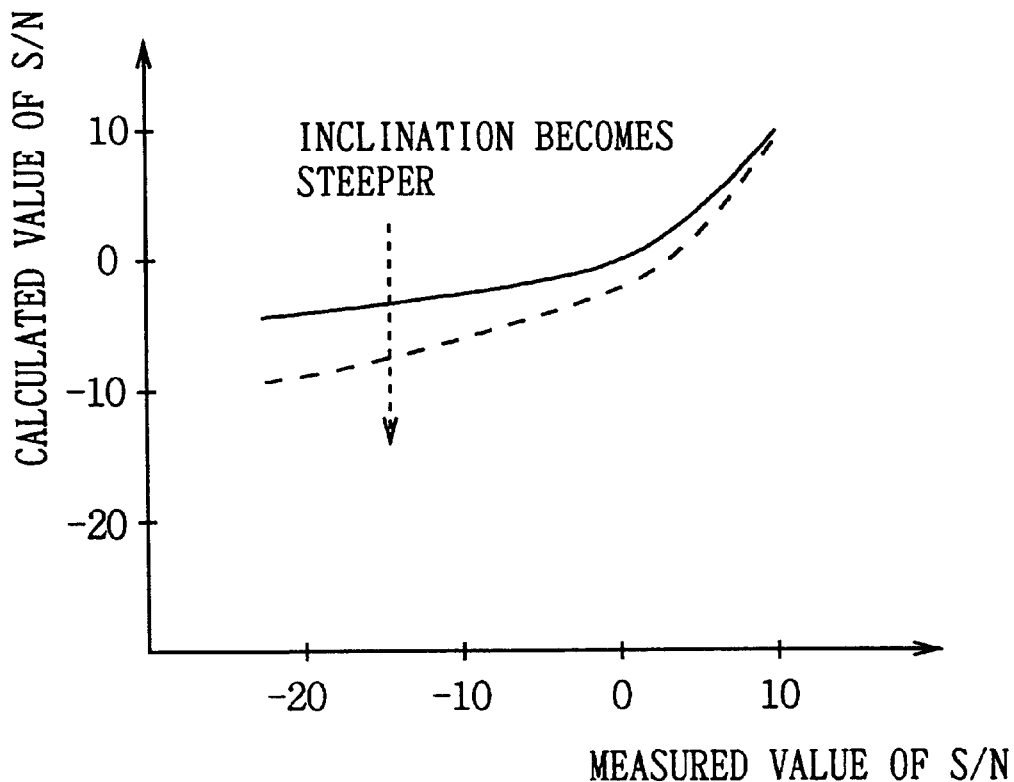
FIG. 28 is a characteristic curvilinear diagram illustrating the signal-to-noise power ratio S/N obtained by calculation.

According to the foregoing construction, in the case of this eighth embodiment, the pure signal power is not obtained by subtracting the halved noise power S40 from the power S42 of the received signal S27 as the seventh embodiment. However, the pure signal power S144 is obtained subtracting the noise power S149 per symbol from the power S143 per symbol of the received signal S27. Accordingly, in the case of this embodiment, when the noise power S149 becomes large, the signal power S144 becomes smaller than in the case of 7th embodiment, and as a result, the signal-to-noise power ratio S/N to be obtained by the divider 145 becomes smaller. At this point, the signal-to-noise power ratio S/N to be obtained by the divider 145 does not increase evenly, but the larger the noise power S149 becomes it has tendency to become smaller. Therefore, as shown in FIG. 28, the signal-to-noise power ratio S/N obtained by the normal calculation does not show obvious difference under the condition in which the signal to noise power ratio S/N is satisfactory as shown by a solid line, however, according to this embodiment, the difference becomes obvious as shown by a broken line. And thus, the calculation values that become the parameter when tabulating can be differentiated, and tabulated signal-to-noise power ratio S/N, i.e., the weight coefficient S146 can be differentiated, and as a result, the reliability can be reflected to the received symbol S28 with further improved accuracy.

According to the foregoing construction, since the signal power S144 is calculated eliminating the noise element by subtracting the noise power S149 from the average power S143 of the received signal S27, and based on this signal power S144 and the noise power S149, the signal-to-noise power ratio S/N for tabulation is to be obtained, the tabulation for calculating the weight coefficient S146 can be easily conducted.

(9) Other Embodiments

The first embodiment described above has dealt with the case of providing the weight coefficient calculation table 49A consisting of a table of noise to signal power ratio N/(S+N) and the corresponding signal to noise power ratio S/N in the calculation unit 49 and tabulating the corresponding signal-to-noise power ratio S/N ratio based on the noise-to-signal power ratio N/(S+N) obtained by the noise power S40 and signal power S42 and using this as the weight coefficient S43. However, the present invention is not only limited to this but also the weight coefficient may be obtained according to the other method in the calculation unit. For example, let the value of noise power S40 to be A, the value of signal power S42 to be B, the value C to be calculated by the following EQUATION is used as the-signal-to noise power ratio S/N.

$$C = 2^{-k \cdot A/B} \quad (1)$$

And a table showing the relationship between the value A/B and the value C is stored in the weight coefficient calculation table 49A. Then, the value A/B is calculated based on the noise power S40 and the signal power S42 and based on the value of A/B, the corresponding value of C is tabulated from the weight coefficient calculation table 49A. Thus, the signal to noise power ratio S/N is obtained and this may be output as the weight coefficient S43. In this connection, value of the constant k to be used here is the value from "5" to "10", and such as "6" is the optimum value.

Furthermore, the present invention is not only limited to the above. Where the value of noise power S40 is A, and the value of signal power S42 is B, and a table showing the relation between the value of B/A and corresponding signal-to-noise power ratio S/N is stored in the weight coefficient calculation table 49A. Then, based on the noise power S40 and the signal power S42, the value of B/A is calculated and based on this value of B/A, corresponding signal to noise power ratio S/N is obtained from the weight coefficient table 49A and this may be transmitted as the weight coefficient S43.

Furthermore, the present invention is not only limited to this. Where the value of noise power S40 is A, and the value of signal power S42 is B, and a table showing the value of A/B and corresponding noise-to-signal power ratio N/(S+N) is tabulated and this is stored in the weight coefficient calculation table 49A. Then, the value of A/B is calculated based on the noise power S40 and the signal power S42, and based on the value of A/B, the value of corresponding noise-to-signal power ratio N/(S+N) is obtained from the weight coefficient calculation table 49A. Then, multiplying the value of this noise-to-signal power ratio S/(S+N) by the value of B, the value of noise element N is obtained, and by subtracting the value of this noise element N from the value B, the value of signal element S is obtained, and the value of signal-to-noise power ratio S/N is obtained from these noise element N and signal element S and this may be transmitted as the weight coefficient S43.

Moreover, the present invention is not only limited to this. Where the value of noise power S40 is A, the value of signal power S42 is B, and tabulating the value A/B and corresponding signal to noise power ratio S/N into a table and this is stored in the weight coefficient table 49A, and by tabulating based on the value of A/B, the value of signal to noise power ratio S/N may be obtained and output as the weight coefficient S43. Furthermore, the present invention is not only limited to this, but also the value of signal element S is obtained by the value B-A, and tabulating the value D which the value of this signal element S is divided by the value of A and the signal-to-noise power ratio S/N into a table and this is stored in the weight coefficient calculation table 49A, and by tabulating based on the value of D, the signal-to-noise power ratio S/N may be obtained and this may be sent out as the weight coefficient S43.

Figure 29:
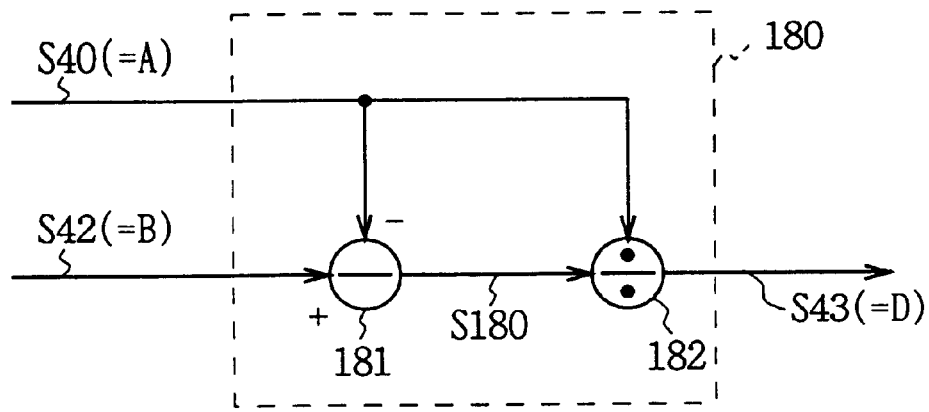
FIG. 29 is a block diagram showing the construction of a calculation unit according to the other embodiment.

Furthermore, the present invention is not only limited to this but also, as shown in FIG. 29, a calculation unit 180 may be constituted by a subtracter 181 and a divider 182 and the value of signal element S may be obtained by the value B-A obtained by the subtracter 181, and the value D of which signal element S is divided by the value of A may be used as the signal-to-noise power ratio S/N as it is and this may be sent out as the weight coefficient S43. In this connection, in the case where the value D is used as the weight coefficient S43 as it is, this system has an advantage for simplifying the construction of calculation unit 49, although the accuracy as the weight coefficient becomes worse in some degree as compared with the tabulation using the table.

Furthermore, the fourth embodiment described above has dealt with the case of utilizing the signal-to-interference wave power ratio S/I as the weight coefficient S81. In this fourth embodiment, the weight coefficient calculation table 109 showing the relationship between the dispersion values of I element and Q element and the signal-to-interference wave power ratio S/I is prepared and by tabulating this weight coefficient calculation table 109 based on the dispersion values of I element and Q element, the signal-to-interference wave power ratio S/I is read out and this is used as the weight coefficient S81. However, the present invention is not only limited to the above but also the weight coefficient may be calculated by the predetermined calculation. For example, where the dispersion value of I element is A, and the dispersion value of Q element is B, and the received signal S27 obtained by squaring the amplitude of received signal S27 and adding it for one slot is C, the value D is obtained from the following EQUATION:

$$D = k1 \times A / C^2 \times k2 \times A/B \quad (2)$$

Using the value D, the value "a" is obtained by the following EQUATION:

$$a = k3 \times 2^{-D} \quad (3)$$

This value "a" may be sent out as the weight coefficient. Provided that k1, k2, k3 are constants respectively, and the value of k1 to be used here is approximately "2" to "5" and especially such as "3" is the optimum value for k1. The value of k2 is around "0.1" to "1.0" and the optimum value is "0.5", and the value of k3 is approximately "1" to "8" and the optimum value is "3".

Furthermore, the value b is obtained by the following EQUATION and this value b may be transmitted as the weight coefficient.

$$b = k3 \times 2^D / C \quad (4)$$

Moreover, in the case where the power per slot is amplified to become constant by the receiver circuit 31, the value D may be defined as follows:

$$D = k1 \times A + k2 \times A/B \quad (5)$$

And the value D may be obtained by the above EQUATION.

$$D = k2 \times A/B \quad (6)$$

Or, it may be obtained by the above EQUATION.

Moreover, where the dispersion value of I element is A, the dispersion value of Q element is B, and the average amplitude of Q element is obtained and making this value to be E, and the number of symbols in one slot to be N, the value F is calculated using the following EQUATION:

$$F = k4 \times (A - k5 \times B)/(E \times N) \quad (7)$$

And using this value F, the value d is obtained.

$$d = k6 \times 2^{-F} \quad (8)$$

This value d may be transmitted as the weight coefficient. Provided that, when the value F obtained in EQUATION (7) is lower than "0", EQUATION (8) is calculated as F=0. Moreover, k4, k5, k6 are constants, and the value of k4 is approximately "3" to "10" and especially around "6" is the optimum value, the value of K5 is approximately "1" to "3" and the optimum value is such as "2", and the value of k6 is optional value.

Moreover, when the power per slot is amplified to become constant by the receiver circuit 31, the value F may be expressed in the following EQUATION:

$$F = k4 \times (A - k5 \times B) \quad (9)$$

And the value F may be obtained by the EQUATION shown above.

Furthermore, the fourth embodiment described above has dealt with the case of shifting the position of each symbol on or around Q axis on the complex plane by $\pi/4$ shifting the phase of received symbol S70 transformed to the upper right quadrant on the complex plane. However, the present invention is not only limited to this but also the position of each symbol may be shifted to the I axis on the complex plane by $-\pi/4$ shifting the phase of received symbol S70 transformed to the upper right quadrant. However, in this case, I element and Q element should be treated reversed with respect to the fourth embodiment.

Furthermore, the sixth embodiment described above has dealt with the case of calculating the weight coefficient S100 in which the weight coefficient S43 calculated by the first weight coefficient calculation unit 52 and the weight coefficient S81 calculated by the second weight coefficient calculation unit 89 are combined by tabulating them into a table. However, the present invention is not only limited to this but also multiplying the value of the weight coefficient S43 by the value of weight coefficient S81 and the coefficient in which these calculation results are combined may be used as the weight coefficient S100.

Furthermore, the 7th and the 8th embodiments described above have dealt with the case of halving the noise power S40 or S149 by providing a 1/2 circuit 143. However, the present invention is not only limited to this but the signal-to-noise power ratio S/N may be obtained by eliminating the 1/2 circuit 143 and utilizing the noise power S40 or S149 as it is.

Moreover, the 7th embodiment described above has dealt with the case of obtaining the signal power S111 formed of only signal element by subtracting the noise power S110 from the signal power S42 containing noise element and signal element and obtaining the signal-to-noise power ratio S/N in utilizing said signal power S111. However, the present invention is not only limited to this but also the signal-to-noise power ratio S/N may be obtained according to the construction as shown in FIG. 30.

Figure 30:
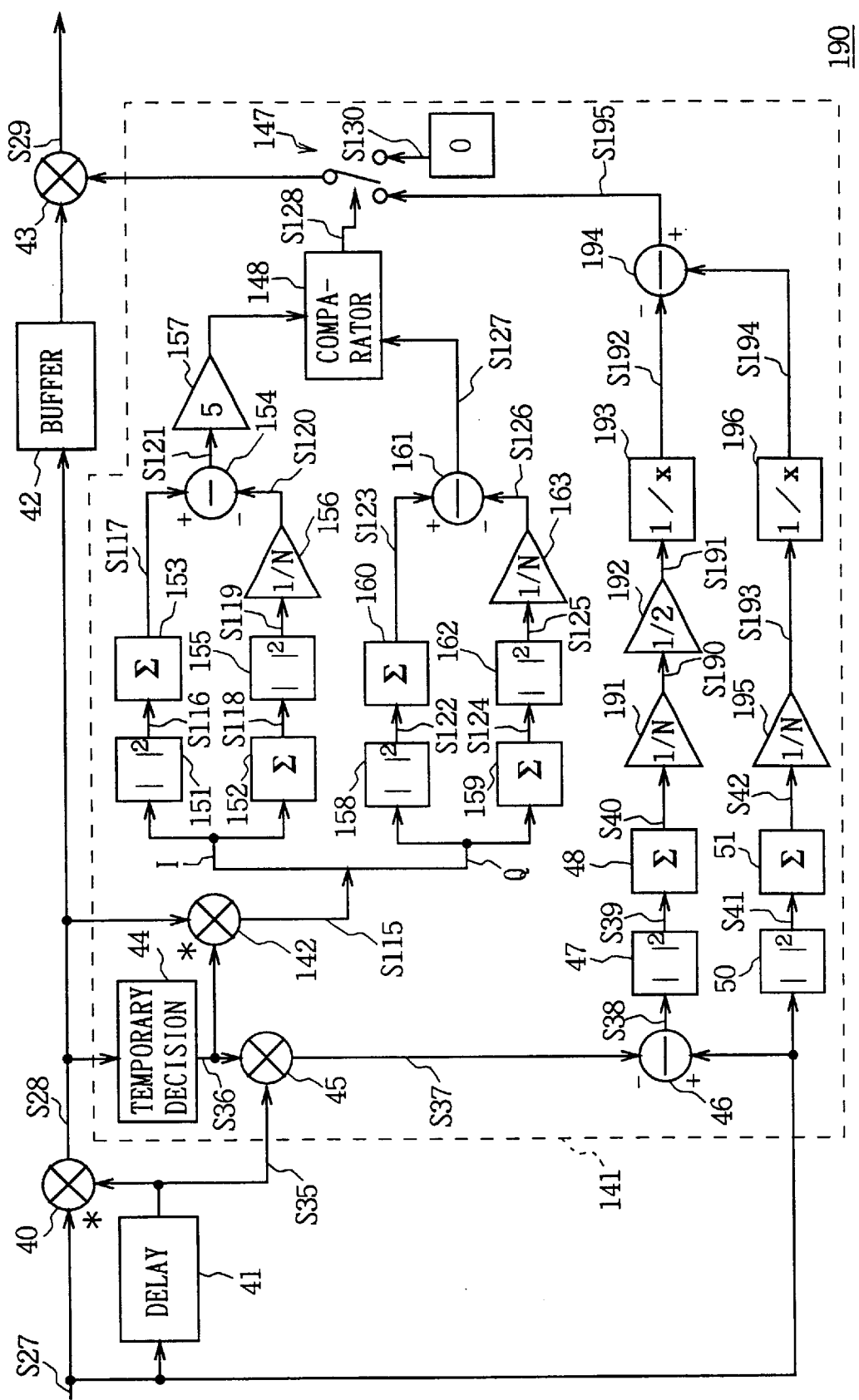
FIG. 30 is a block diagram showing the construction of a demodulation circuit according to the other embodiment.

More specifically, in FIG. 30, in which corresponding parts of FIG. 23 are given the same reference numerals, 190 generally shows a demodulation circuit, and in the case of this demodulation circuit 190, one slot of noise power S40 calculated by the first adder circuit 48 is fed to a 1/N circuit 191. The 1/N circuit 191 obtains noise power S190 per symbol by dividing the noise power S40 by the number of symbols N and outputs this to a 1/2 circuit 192. The 1/2 circuit 192 halves this noise power S190 and outputs the resultant noise power S191 to an inverse calculation circuit 192. The inverse calculation circuit 193 obtains an inverse value of this noise power S191 and outputs this to a subtracter 194. As it is clear from the explanation described above, the inverse value S192 shows the inverse value of noise element N, i.e., 1/N.

On the other hand, one slot of signal power S42 calculated by the second adder circuit 51 is fed to the 1/N circuit 195. The 1/N circuit 195 obtains signal power S193 per symbol by dividing the signal power S42 by the number of symbols N and outputs this to an inverse calculation circuit 196. The inverse calculation circuit 196 obtains an inverse value S194 of this signal power S193 and outputs this to said subtracter 194. In this connection, since the signal power S42 is formed of pure signal element S and noise element N, this inverse value S194 shows 1/(S+N).

The subtracter 194 obtains the difference between the inverse value S194 and the inverse value S192 and outputs the resulting S195 to the select switch 147 as the signal-to-noise power ratio S/N to the select switch 147. Thus, in the multiplier 43, by multiplying the received symbol S28 by this calculation result S195 as a weight coefficient, the reliability of slot is reflected to said received symbol S28. With this arrangement, if the difference between the inverse value S194 of the signal power S193 and the inverse value S192 of the noise power S190 is made as the signal-to-noise power ratio, the reliability of slot can be reflected to the received symbol S28 and similar effects as those of the 7th embodiment can be obtained. In this connection, according to the construction shown in FIG. 30, the signal-to-noise power ratio S/N may be obtained by eliminating 1/N circuits 191 and 195 and utilizing the noise power S40 and signal power S42. Furthermore, according to the construction shown in FIG. 30, the signal-to-noise power ratio S/N obtained is not supplied to the comparator 148 as in the case of seventh embodiment. However, as in the case of seventh embodiment, the signal-to-noise power ratio S/N may be fed to the comparator 148 and the switch operation of the select switch 147 by the comparator 148 may be prohibited corresponding to the value of said signal-to-noise power ratio S/N.

Moreover, the embodiment described above has dealt with the case of applying the present invention to a wireless communication system which communicates by the TDMA system. However, the present invention is not only limited to this but, for example, if it were applied to the wireless communication system shown in FIGS. 31 and 32, the same effects as those of the case described above can be obtained.

Figure 31:
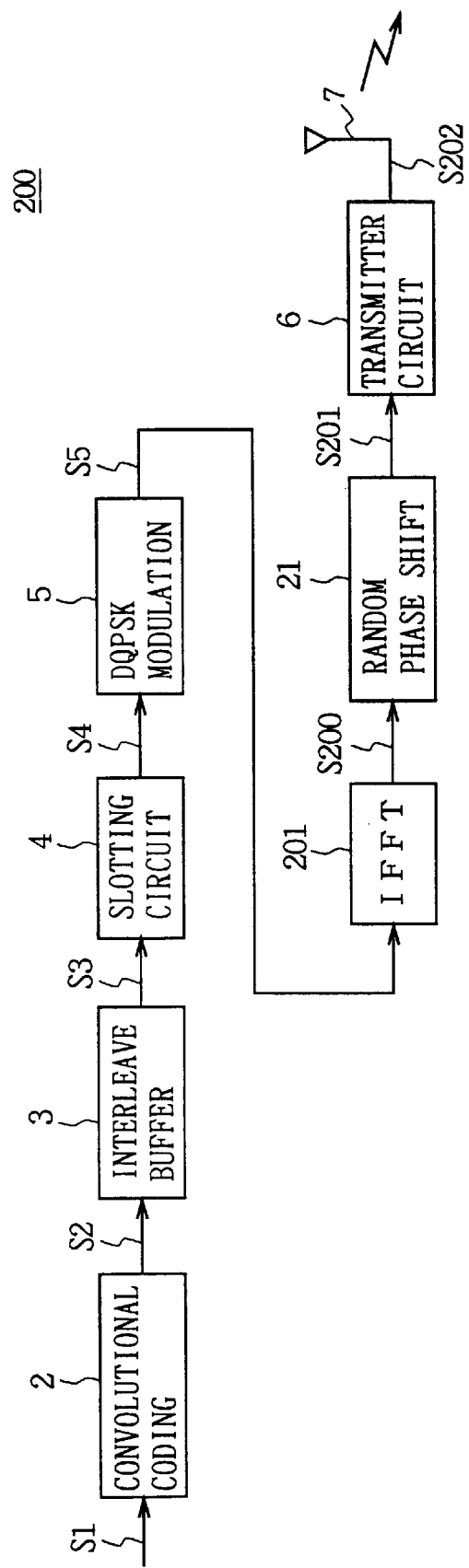
FIG. 31 is a block diagram showing a transmitting device of the wireless communication system according to the other embodiment.

The wireless communication system shown in FIGS. 31 and 32 will be described as follows. First, in FIG. 31 in which corresponding parts of FIG. 4 are given the same reference numerals, 200 generally shows a transmitting device of the wireless communication system. In this transmitting device 200, transmission signal S5 generated by the DQPSK modulation circuit 5 is supplied to a high speed inverse Fourier transform circuit (IFFT) 201. The high speed inverse Fourier transform circuit 201 piles symbol information of the transmission signal S5 over phase differences of multiple carriers whose frequencies are at the fixed distance away and inputs the transmission signal S200 formed of that multiple carriers to a random phase shift circuit 21. The random phase shift circuit 21, by adding the random phase value generated by the prescribed rules based on the initial phase value to the phases of multiple carriers forming the transmission signal S200, randomizes the phase values of multiple carriers and supplies the resulting transmission signal S201 to the transmitter circuit 6. The transmitter circuit 6, after applying the fixed processing to this transmission signal S201, applying the frequency transform processing to the transmission signal S201, transforms to a transmission signal S202 having the prescribed frequency channel, and transmits this via an antenna. In the case of this wireless communication system, the transmitter circuit 6 randomizes the frequency channel of the transmission signal S202 per the fixed timing, that is, frequency hopping is conducted.

Figure 32:
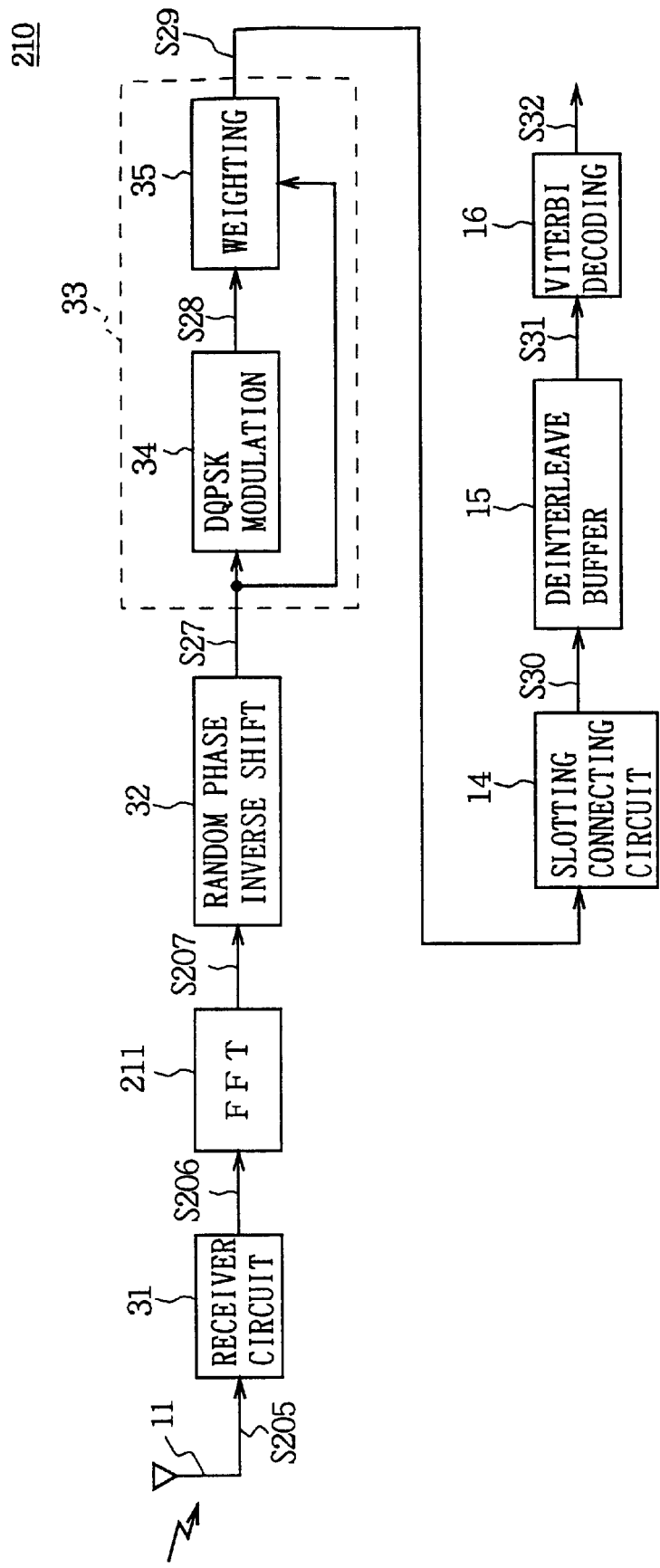
FIG. 32 is a block diagram showing a receiving device of the wireless communication system according to the other embodiment.

On the other hand, in FIG. 32 in which corresponding parts of FIG. 5 are given the same reference numerals, 210 generally shows a receiving device of this wireless communication system. And in the case of this receiving device 210, a received signal S205 received by an antenna 11 is fed to a receiver circuit 31. The receiver circuit 31, applying the frequency transforming processing to the received signal S205 of the fixed frequency channel, extracts baseband signal S206 and outputs this to a high speed Fourier transform circuit (FFT) 211. The high speed Fourier transform circuit 211 takes out symbol information formed of phase information on which multiple carriers are piled by the Fourier transform processing and outputs this to a random phase inverse shift circuit 32 as a received symbol S207. The random phase inverse shift circuit 32 restores the phase condition of the received signal S207 to the former condition using the same phase value as the transmitting side and outputs the resultant received signal S27 to a demodulation circuit 33. Hereinafter the explanation will be omitted since it is the same as the receiving device 30 described above. Accordingly, if the present invention is applied to the wireless communication system which piles the information to be transmitted over the phase difference of multiple carriers and further randomizes the frequency channels on which multiple carriers are loaded, the same effects as those of the case described above can be obtained.

Furthermore, the embodiment described above has dealt with the case of applying the present invention to a wireless communication system of the TDMA scheme. However, the present invention is not only limited to this but also widely applicable to the wireless communication system, provided that in such system, the transmission signal is transmitted after being divided into slot. In that case, as a receiving device, it may be enough if the device is equipped with receiving means for receiving transmission signal and outputting received signal, weighting means for calculating the weight coefficient showing the reliability of slot by which received signal is transmitted based on said received signal transmitted from the receiving means and for multiplying the received signal by said weight coefficient and outputting it, and decoding means for decoding the received signal transmitted from the weighting means and for restoring the data transmitted.

According to the present invention as described above, since the weight coefficient showing the reliability of slot is calculated and the received signal multiplied by said weight coefficient is decoded, the maximum likelihood sequence estimation can be conducted upon adding the reliability of slot in the decoding means, and thus, even in the case where the qualities of communications vary by slot, the data transmitted upon being conducted the maximum likelihood sequence estimation with a high precision can be restored with higher accuracy.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A receiving method for receiving a signal composed of a set of predetermined information units, comprising the step of:

receiving said signal;

performing processing for shifting a phase of said signal received in said step of receiving that has been shifted at random at a time of transmission to an opposite phase to produce a processed signal;

calculating a weight coefficient representing a reliability of said received signal for each of said set of predetermined information units;

weighting said processed signal by said weight coefficient; and decoding said weighted signal.

2. The receiving method according to claim 1, wherein said signal composed of a set of predetermined information units is a signal transmitted according to a Time Division Multiple Access (TDMA) method, and said predetermined information unit is a time slot.

3. The receiving method according to claim 1, wherein said signal composed of a set of predetermined information units is a signal transmitted according to a multi-carrier method, and said predetermined information unit is a sub-carrier or sub-carriers.

4. The receiving method according to claim 3, wherein said signal of the multi-carrier method is divided in a time direction, and said predetermined information unit is a predetermined time portion of one of a predetermined sub-carrier and sub-carriers.

5. The receiving method according to claim 1, wherein said step of weighting comprises multiplying said weight coefficient and said received signal, and said step of decoding comprises soft-decision decoding.

6. The receiving method according to claim 1, wherein said step of calculating a weight coefficient includes the calculating a ratio of values relating to signal power and noise power.

7. The receiving method according to claim 6, wherein said step of calculating a ratio includes calculating a degree of phase dispersion of the received signal.

8. A receiving device for receiving a signal composed of a set of predetermined information units, comprising:
receiving means for receiving said signal, wherein said receiving means includes means for performing processing for shifting a phase of the received signal which has been shifted at random at a time of transmission to an opposite phase;
weight coefficient calculating means for calculating a weight coefficient representing a reliability of a signal output from said receiving means for each of said set of predetermined information units;
weighting means for weighting said signal output from said receiving means by said weight coefficient; and
decoding means for decoding a weighted signal output from said weighting means.

9. The receiving device according to claim 8, wherein said signal composed of a set of predetermined information units is a signal transmitted according to a Time Division Multiple Access (TDMA) method, and each predetermined information unit is a time slot.

10. The receiving device according to claim 8, wherein said signal composed of a set of predetermined information units is a signal transmitted according to a multi-carrier method, and each predetermined information unit is one of a sub-carrier and sub-carriers.

11. The receiving device according to claim 10, wherein said signal of the multi-carrier method is divided in a time direction, and said predetermined information unit is a predetermined time portion of one of a predetermined sub-carrier and sub-carriers.

12. The receiving device according to claim 8, wherein said weighting means includes means for multiplying said weight coefficient and said received signal, and said decoding means includes means for performing soft-decision decoding.

13. The receiving device according to claim 8, wherein said weight coefficient calculating means includes means for finding a ratio of values relating to signal power and noise power.

14. The receiving device according to claim 13, wherein said means for finding a ratio includes means for calculating a degree of phase dispersion of the received signal.

15. The receiving device according to claim 12, wherein said means for performing soft-decision decoding is a Viterbi decoder.

16. A receiving device for receiving a signal composed of a set of predetermined information units, comprising:
receiving means for receiving said signal;
weight coefficient calculating means for calculating a weight coefficient representing a reliability of a signal output from said receiving means for each of said set of predetermined information units, wherein said weight coefficient calculating means includes means for finding a ratio of values relating to signal power and noise power;
weighting means for weighting said signal output from said receiving means by said weight coefficient; and
decoding means for decoding a weighted signal output from said weighting means,
wherein said means for finding the ratio of values relating to said signal power and noise power operates on a difference between the received signal which is not delayed and the received signal which is delayed.

17. A receiving device for receiving a signal composed of a set of predetermined information units, comprising:
receiving means for receiving said signal;
weight coefficient calculating means for calculating a weight coefficient representing a reliability of a signal output from said receiving means for each of said set of predetermined information units, wherein said weight coefficient calculating means includes means for finding a ratio of values relating to signal power and noise power;
weighting means for weighting said signal output from said receiving means by said weight coefficient; and
decoding means for decoding a weighted signal output from said weighting means, wherein said means for finding the ratio of values relating to said signal power and noise power operates on a difference between an average level and a current level of the received signal.

18. A receiving device for receiving a signal composed of a set of predetermined information units, comprising:
receiving means for receiving said signal;
weight coefficient calculating means for calculating a weight coefficient representing a reliability of a signal output from said receiving means for each of said set of predetermined information units;
weighting means for weighting said signal output from said receiving means by said weight coefficient; and
decoding means for decoding a weighted signal output from said weighting means,
wherein said weight coefficient calculating means includes means for finding a ratio of values relating to signal power and noise power, and said means for finding a ratio includes means for calculating a degree of phase dispersion of the received signal,
wherein said means for calculating a degree of phase dispersion includes means for calculating the dispersion based on an amplitude element and a power element of a first element and a second element of an orthogonal element of the signal output from said receiving means, and
wherein said means for calculating a degree of phase dispersion includes means for calculating a comparison of dispersion values of said first element and second element.

19. The receiving device according to claim 18, wherein said orthogonal element is an In phase and Quadrature (I/Q) signal.

20. The receiving device according to claim 18, wherein said orthogonal element is r/Θ element signal of a polar coordinate signal.

21. The receiving device according to claim 18, wherein said means for calculating the weight coefficient includes means for subtracting a noise power per symbol from a power of the received signal per symbol so as to obtain a pure signal power.

* * * * *